July 16, 1935.    W. H. FOSTER    2,008,011
LATHE
Filed April 19, 1929    9 Sheets-Sheet 1

Inventor:
William H. Foster
By: Wilkinson, Huxley, Byron & Knight
Attys

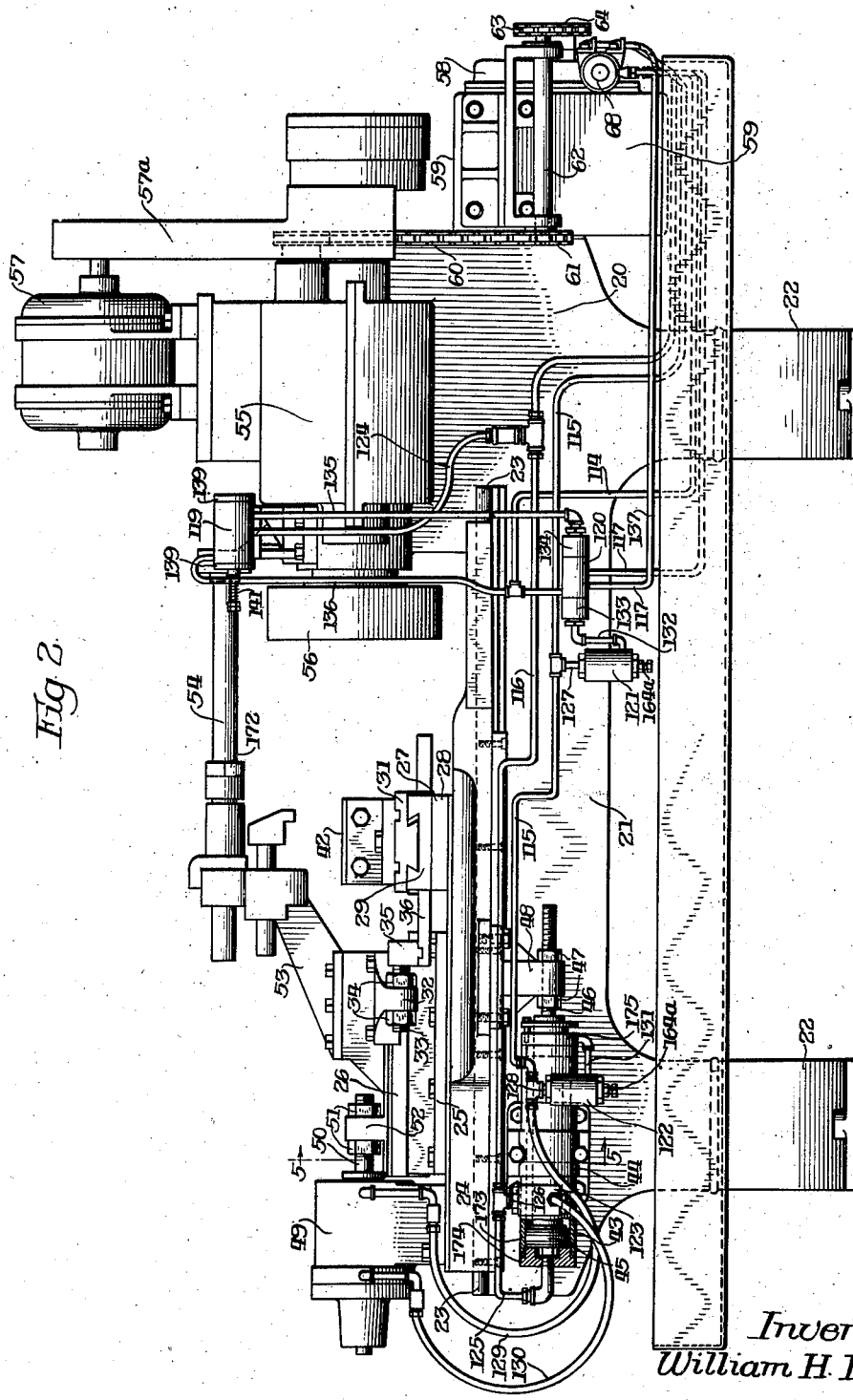

July 16, 1935.  W. H. FOSTER  2,008,011
LATHE
Filed April 19, 1929  9 Sheets-Sheet 3
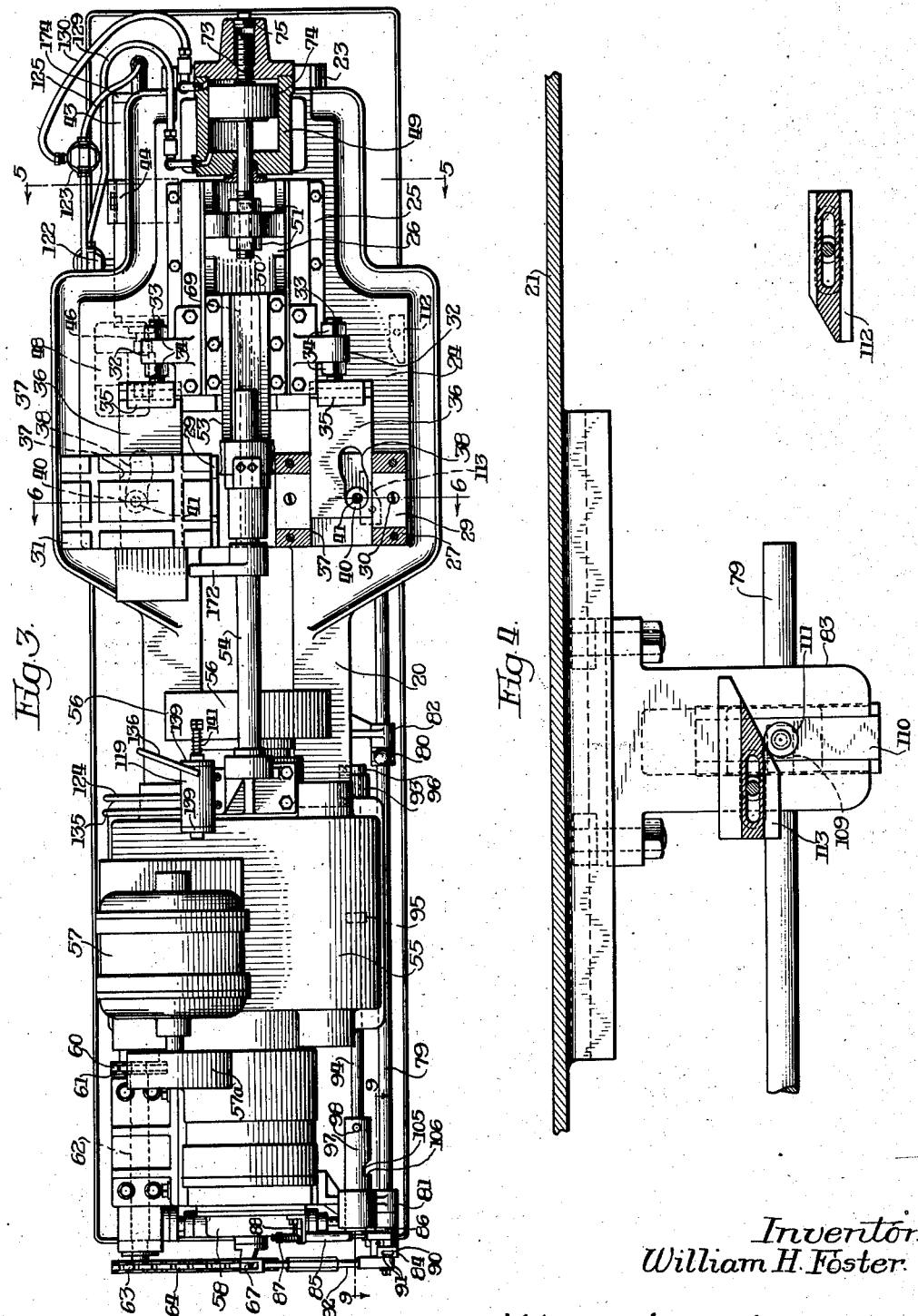
Inventor
William H. Foster

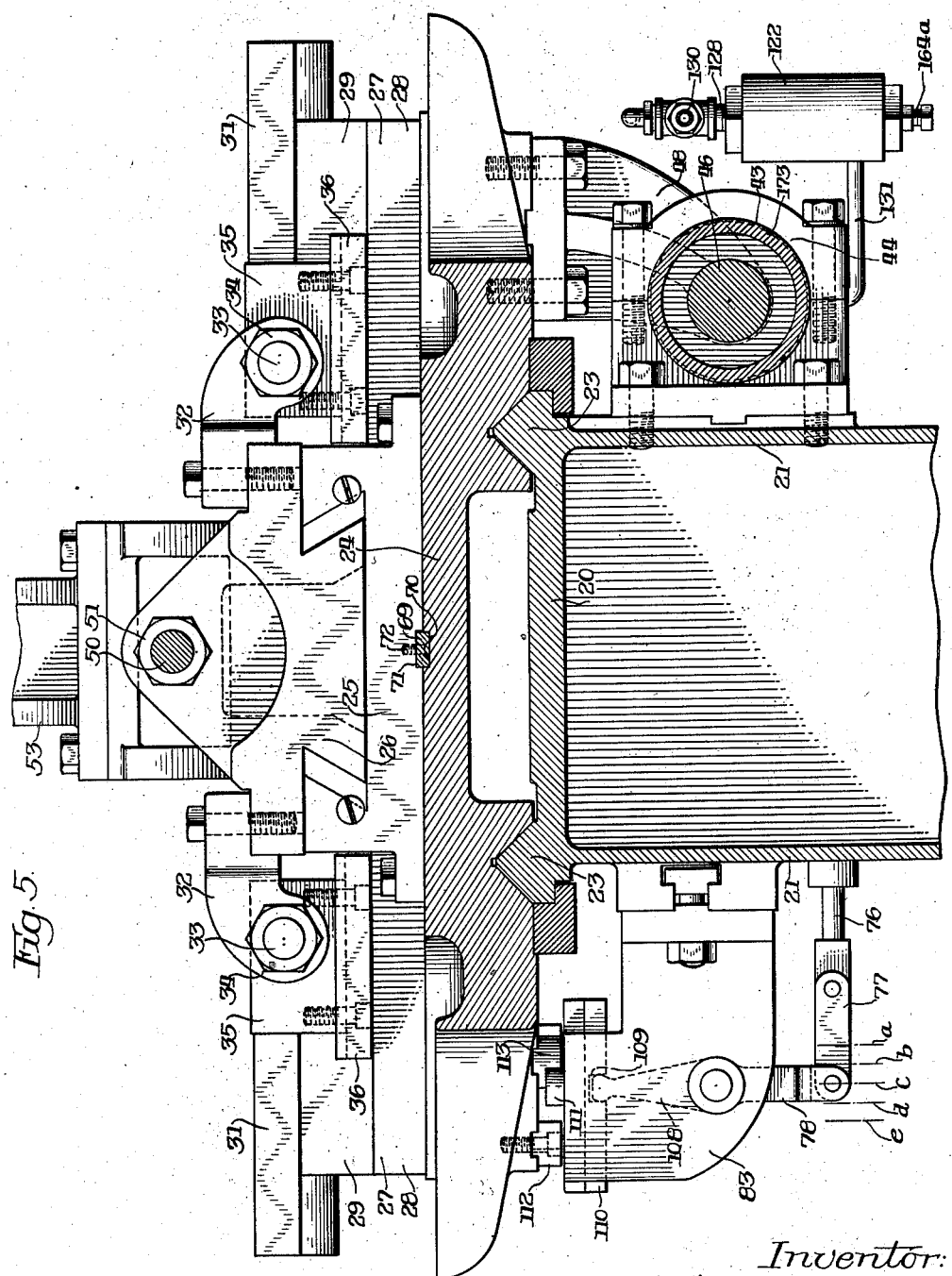

July 16, 1935.  W. H. FOSTER  2,008,011
LATHE
Filed April 19, 1929   9 Sheets-Sheet 5
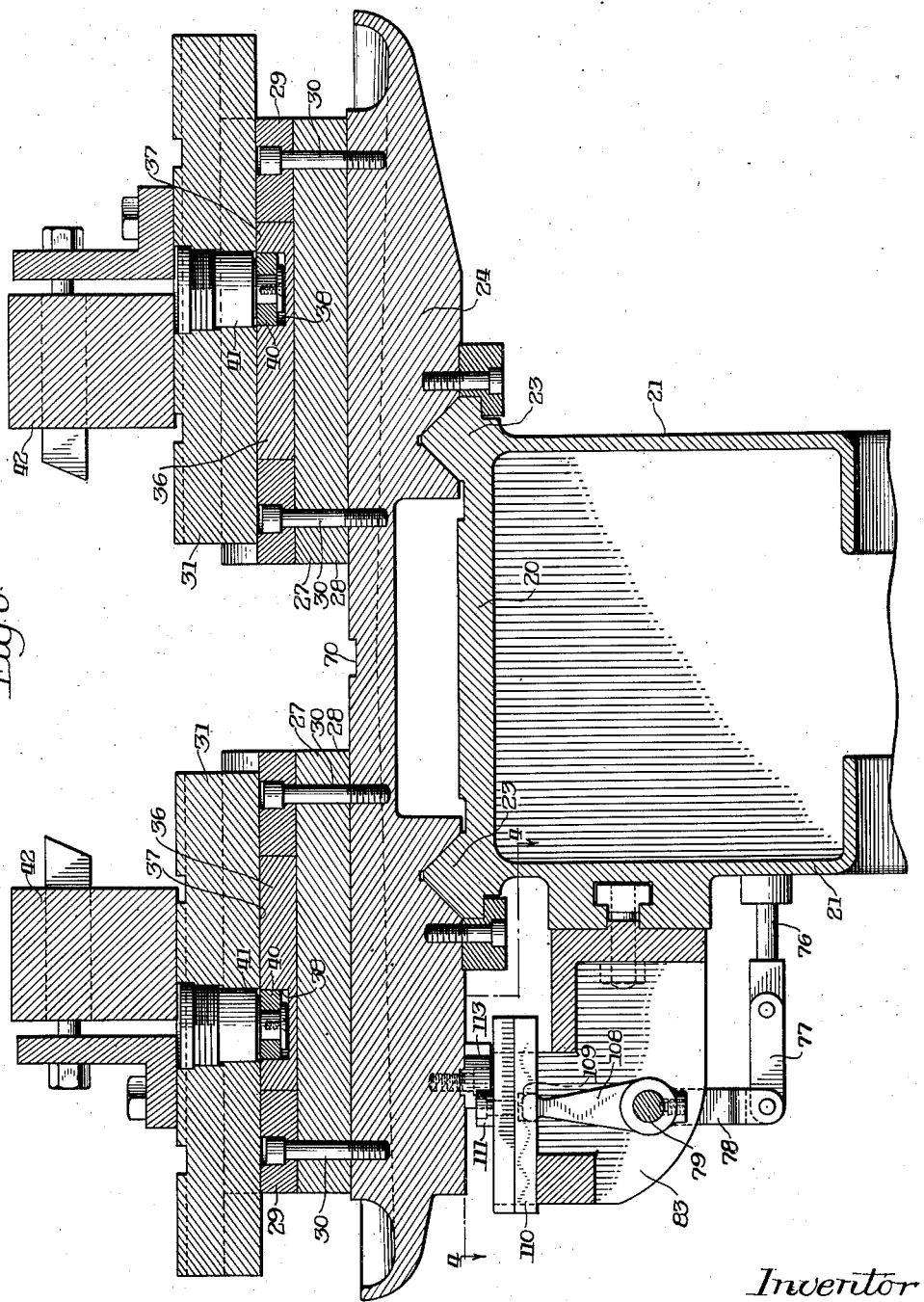
Inventor
William H. Foster July 16, 1935.  W. H. FOSTER  2,008,011
LATHE
Filed April 19, 1929   9 Sheets-Sheet 6
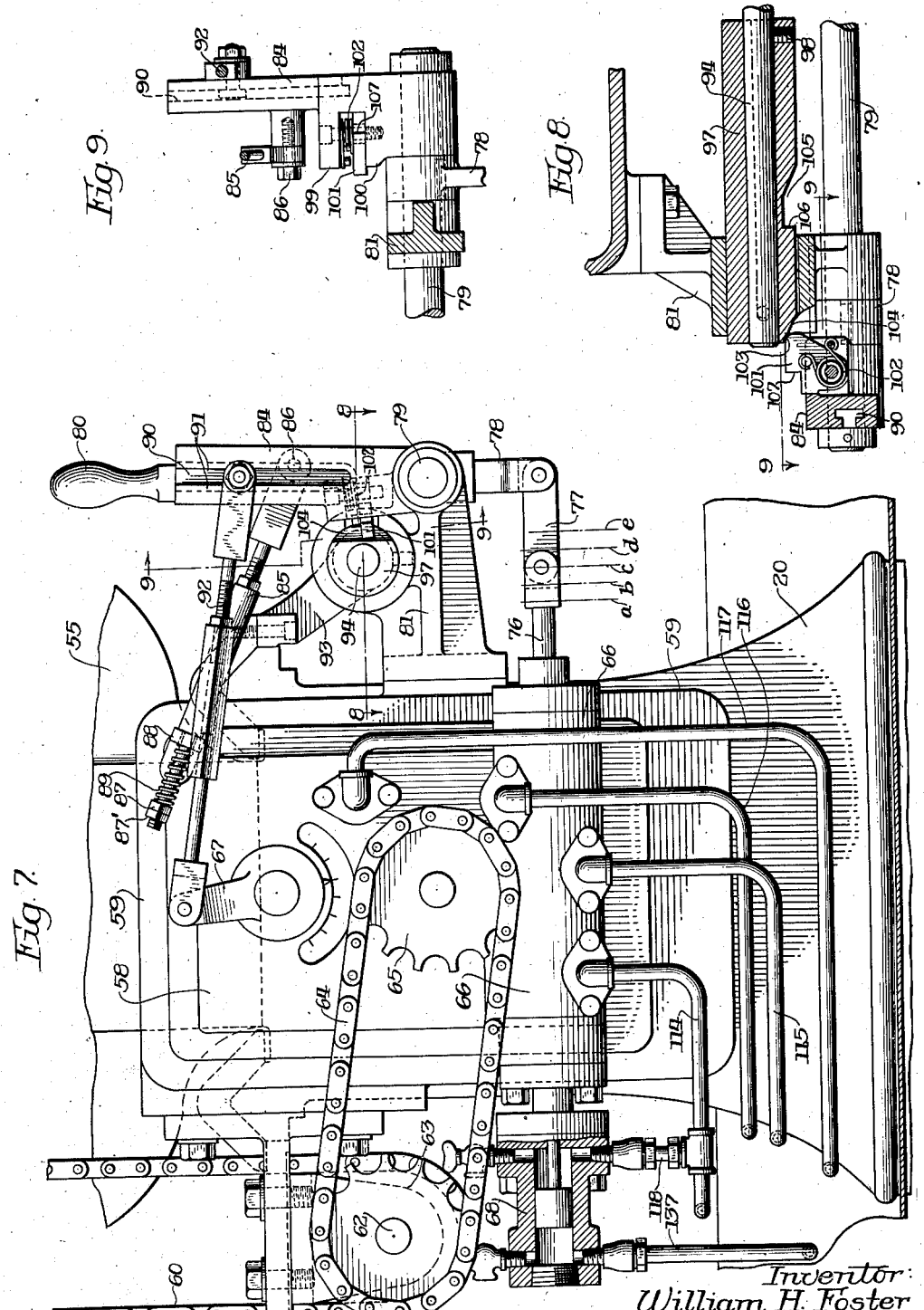

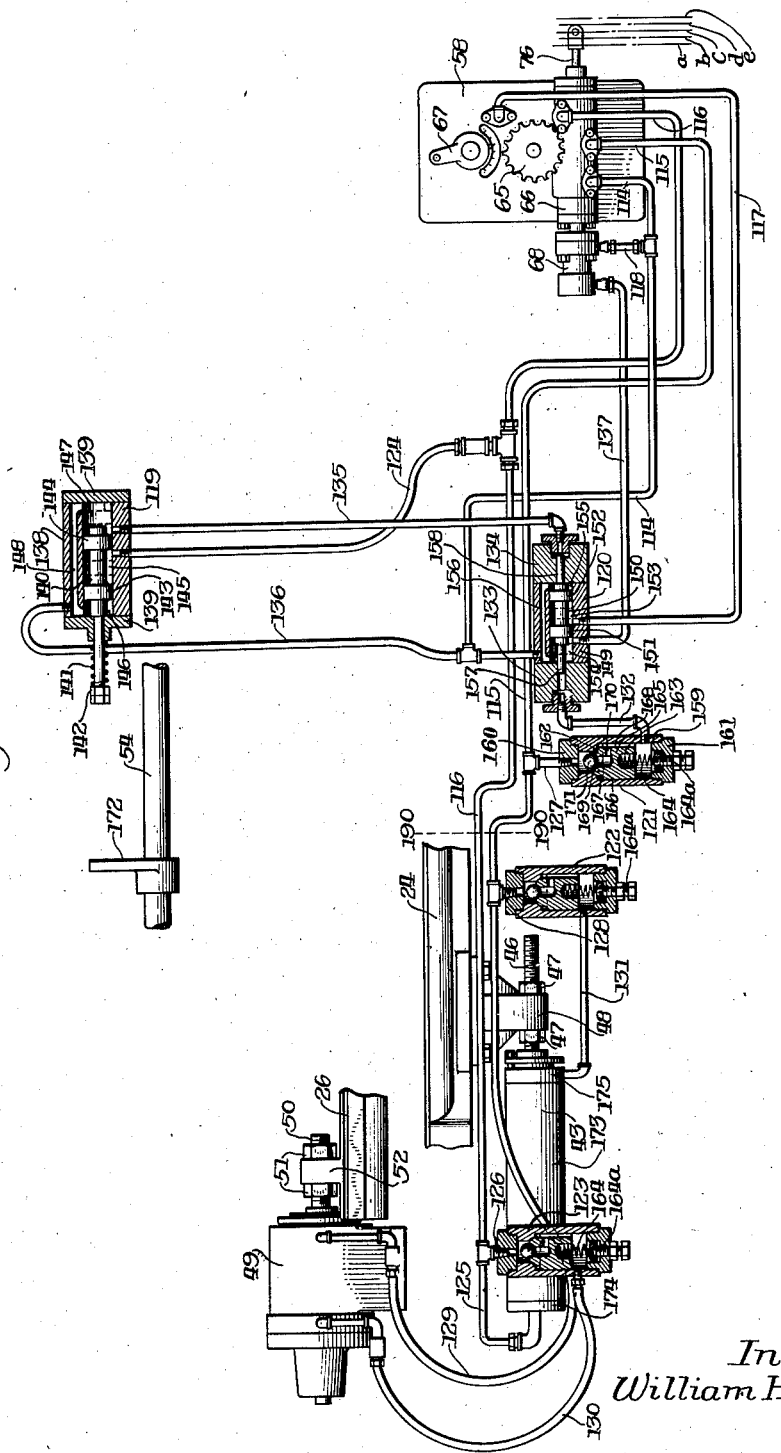

July 16, 1935.  W. H. FOSTER  2,008,011
LATHE
Filed April 19, 1929   9 Sheets-Sheet 8
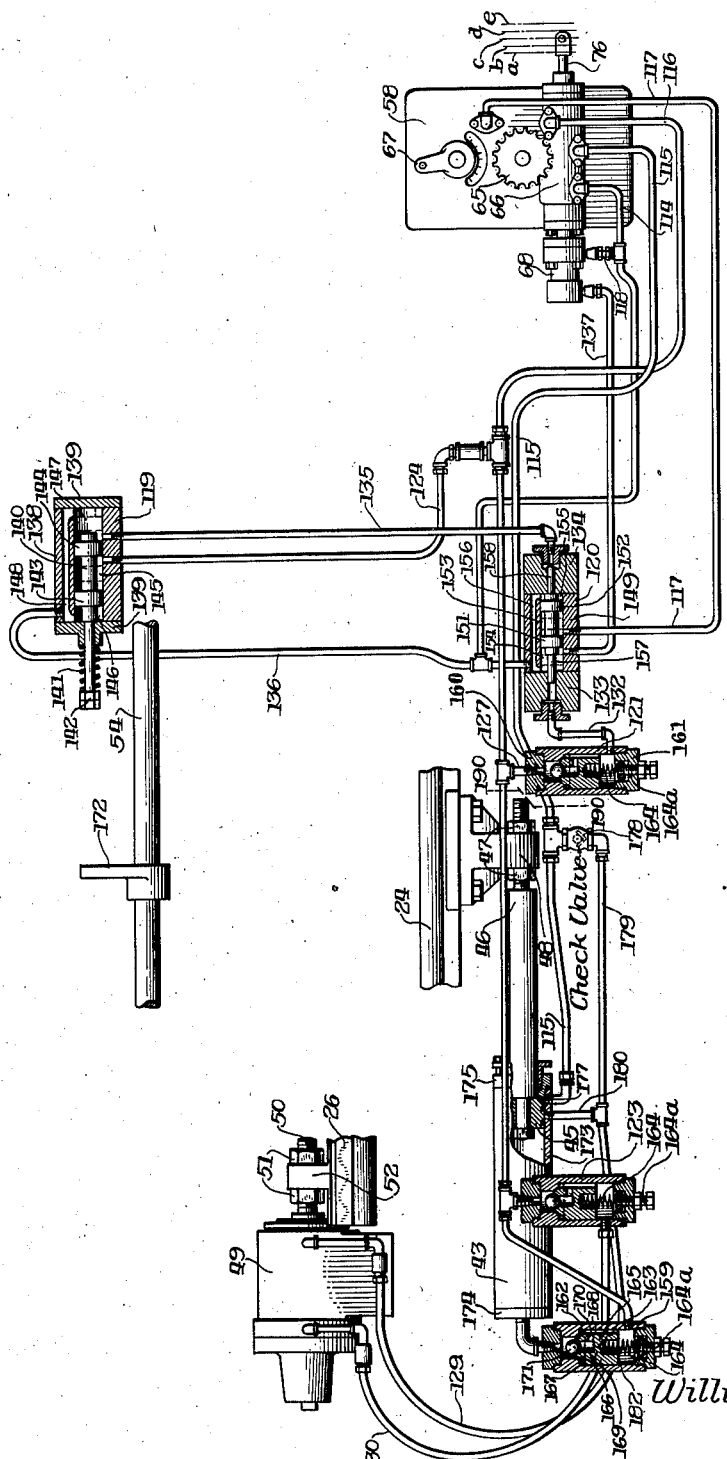
Fig. 11.
Inventor:
William H. Foster.

July 16, 1935.  W. H. FOSTER  2,008,011
LATHE
Filed April 19, 1929  9 Sheets-Sheet 9

Inventor.
William H. Foster.
By:- Wilkinson, Huxley, Byron & Knight
Attys.

Patented July 16, 1935

2,008,011

UNITED STATES PATENT OFFICE 2,008,011

LATHE

William H. Foster, Elkhart, Ind.

Application April 19, 1929, Serial No. 356,434

41 Claims. (Cl. 29—27)

The present invention relates to improvements in lathes.

More particularly the present invention relates to lathes the tool operating members of which are fluid pressure operated. Expressed in other language, the present invention relates to lathes of the type known generally in the art as hydraulic lathes, or hydraulically operated lathes.

The present invention contemplates a structure of lathe involving a tool carrying slide moveable longitudinally of the lathe toward and away from the work holding chuck. The present invention also contemplates cross slides which may be connected to the longitudinally movable slide, whereby cross cuts may be taken simultaneously with the operations of the longitudinally slidable tool holding member.

An object of the present invention is to provide a construction of lathe whereby a plurality of cutting operations may be performed either simultaneously or in timed relationship with one another, which cutting operations may be accurately and expeditiously performed.

A further object is to provide a lathe of the fluid pressure operated type in which the speeds during various stages of operations may be accurately controlled.

A further object is to provide a fluid pressure operated lathe having simple and sturdy controls, which is well adapted to meet the needs of commercial service for the accurate and speedy machining of the work to be operated upon.

A further object is to provide a fluid pressure operated lathe having a cross cutting tool so controlled that the danger of scoring the work when the cross cutting tool is withdrawn is obviated.

Further objects will appear as the description proceeds.

Referring to the drawings—

Figure 2 is a rear elevation of the embodiment shown in Figure 1;

Figure 3 is a top plan view of the embodiment shown in Figures 1 and 2;

Figure 4 is a sectional view taken along the planes indicated by the arrows 4—4 of Figures 1 and 6;

Figure 5 is a sectional view taken along the planes indicated by the arrows 5—5 of Figures 2 and 3;

Figure 6 is a sectional view taken along the plane indicated by the arrows 6—6 of Figure 3;

Figure 7 is an end view of the embodiment shown in Figures 1, 2 and 3;

Figure 8 is a sectional view taken along the planes indicated by the arrows 8—8 of Figures 1 and 7;

Figure 9 is a sectional view taken along the planes indicated by the arrows 9—9 of Figures 3, 7 and 8;

Figure 10 is a diagrammatic view illustrating portions of the structure shown in the preceding figures, Figure 10 relating particularly to the fluid pressure circuits;

Figure 11 is an alternative diagrammatic view illustrating the relation of the fluid pressure circuits to the structures shown in Figures 1 to 9, inclusive.

Figure 1:
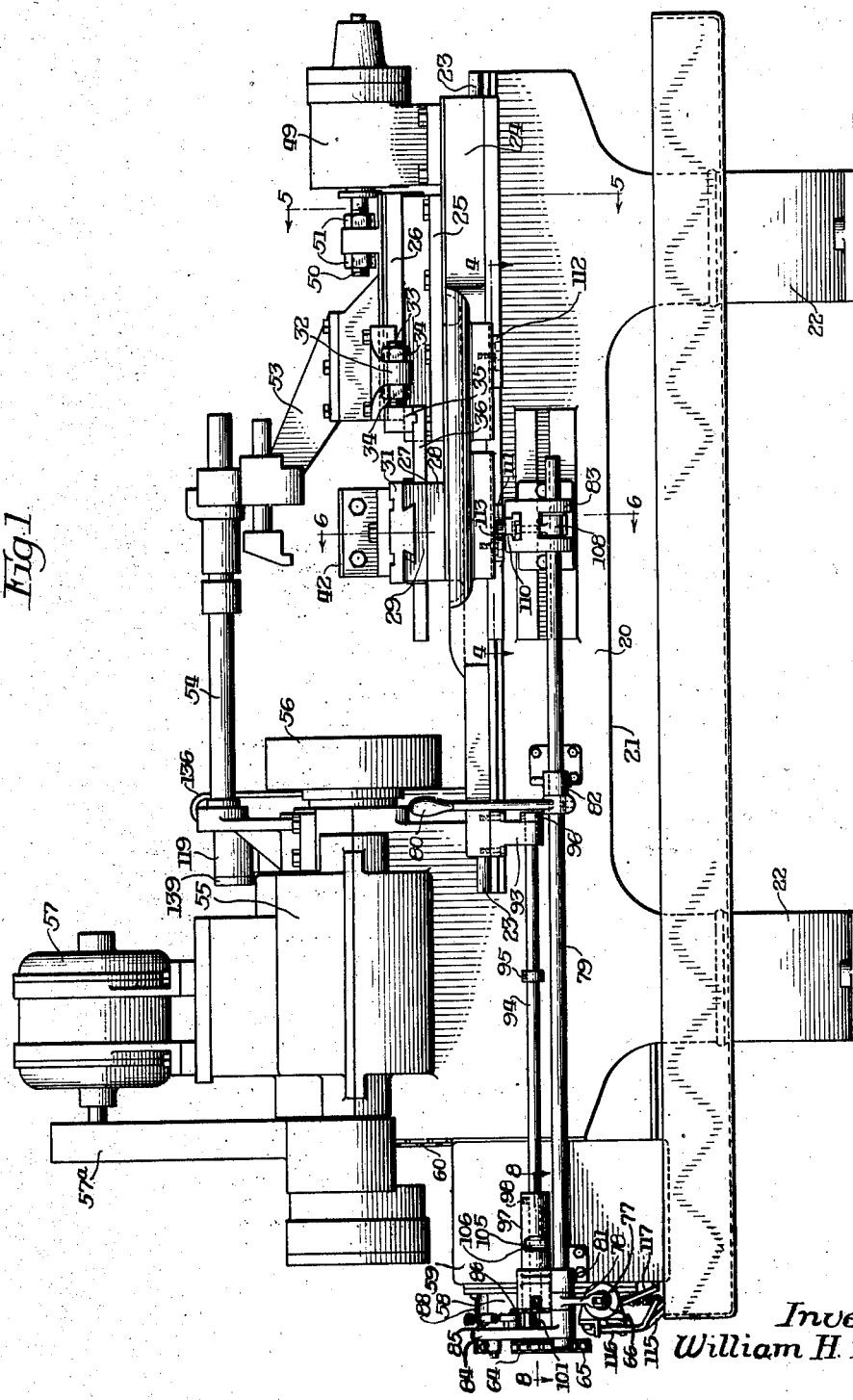
Figure 1 is a view in front elevation of one embodiment of the present invention.

Before proceeding with the detailed description of the instrumentalities illustrated in the figures of the drawings, a short prefatory statement will be made of the functions of the apparatus illustrated in said drawings.

The present invention contemplates a lathe having a headstock, which headstock is provided with a rotary chuck or other work holding member. Movable toward and away from said chuck is a platen, which platen is provided with a fluid pressure responsive means, as for example a hydraulic cylinder (preferably an oil cylinder), for moving said platen. Slidably carried by said platen for movement toward and away from the chuck is a tool carrying slide. Cross slides are provided on said platen, which cross slides through cam or other connections are adapted to be moved transversely of the lathe in response to movements of said longitudinally movable slide. Each of said cross slides may carry one or more tools, which tools may straddle the work carried by the chuck. Roughing cuts may be made by the tools carried by one of said cross slides, and finishing cuts may be made by the tools carried by the other of said cross slides. The present invention contemplates a lathe in which the speed at various regions within the range of travel of the longitudinally movable platen or the slide or slides carried by said platen may be predetermined and accurately controlled, whereby, for example, a rapid traverse movement may be had to move the tools into proximity to the work to be operated upon, a relatively slow feeding movement during part of the operating or feeding stroke, a feeding movement at a different speed during another part of the operating stroke, a rapid traverse movement in between feeding movements if such rapid traverse movement be desired, and selectable speeds of withdrawal of the cutting tool carried by the longitudinally movable slide. The longitudinal movement of the tool carrying slide may or may not, at the option of the operative, be accomplished by movement of one or both of the cross slides above mentioned.

The operative may inaugurate a cycle of movement of the longitudinally movable tool carrying slide (and corresponding movements of the cross slide or slides if desired) by the operation of a simple instrumentality, as for example a handle. After momentarily tripping such instrumentality, the lathe will operate to advance the tool holding member or members to do their work according to a predetermined cycle and the withdrawal of said tool holding member or members to initial position, thereby completing the cycle, after which the tool holding member or members will come to rest. The present invention contemplates a structure by means of which the operative may assume manual control at any point in the cycle.

As mentioned above, one or both of the cross slides may carry a plurality of cutting tools which may straddle the work to be operated upon, as for example in the simultaneous machining of a plurality of faces spaced longitudinally of the chuck. For such work, when the cutting operation has been completed, the cross slide or slides should be withdrawn before said slides are moved longitudinally of the lathe away from the chuck. In other instances, a facing cut is performed upon the work carried by the chuck only upon that side of said work facing the tail of the machine. In such cases, due to the resiliency of the cutting tool, the work to be operated upon and the supporting means for the cutting tool, there is danger of scoring the finished face of the work in the event that the cross slide is withdrawn before longitudinal movement of said cross slide is had toward the tail of the machine. The present invention contemplates a structure by means of which, at the option of the operative, the transversely operating tools, that is—the facing tools, may be moved a short distance away from the finished face of the work, after which the transverse withdrawal of the facing tool or tools is had. In explaining the function referred to in the preceding sentence, it may be stated that in the operation of fluid pressure responsive cylinders having parallel relationship with each other difficulty is sometimes encountered in accurately proportioning the pressure applied to said cylinders. For this reason it is preferred in the practice of the present invention to have the plurality of operating cylinders operate in succession rather than simultaneously. Therefore, when the machine is to be operated to withdraw the facing tool from the finished face of the work in the chuck prior to longitudinal movement of the cutting tool away from said work, it is preferred to accomplish this result in either of two manners, as follows: (a) to move the longitudinally movable tool holding slide with the cross slide or cross slides to their fully withdrawn positions, after which the platen carrying said slides is withdrawn to its fully withdrawn position; or (b) to move the platen a short distance in a withdrawing movement, after which the slides carried by said platen are withdrawn to fully withdrawn position, after which the platen is again moved to its fully withdrawn position.

Referring now to a description of the instrumentalities illustrated in the drawings, the numeral 20 indicates a bed, supported by the side walls 21—21, which side walls are supported by the legs 22—22. The bed 20 is provided (Figures 5 and 6) with the ways 23—23, which slidably support the longitudinally movable platen 24. Secured to the platen 24 is the base 25, which base provides a support for the longitudinally movable slide 26. Also secured to the platen 24 are the bases 27—27, each of which bases comprises the block 28 (Fig. 6) and the guide member 29, said guide members and blocks are held in rigid relationship with the platen 24 by means of the bolts 30—30. Said guide members 29—29 are dove-tailed, as shown in Figure 1, for slidably supporting the cross slides 31—31. Movement of the longitudinally movable slide 26 is communicated to the cross slides 31—31 through structure which will now be described. Referring to Figures 1, 2 and 5, it will be noted that the longitudinally movable slide 26 is provided with a pair of brackets 32—32, which brackets provide supporting means for the rods 33—33 extending longitudinally of the lathe. Said rods 33—33 are screw-threaded and are provided with the adjusting nuts 34—34, whereby the positions of the rods 33—33 relative to said brackets 32—32 may be adjusted. Said rods 33—33, at their forward extremities, are provided with the blocks 35, which blocks are secured to cam plates 36—36. Said cam plates 36 are adapted to slide through apertures 37—37 in the guide members 29—29 (Fig. 6). Said cam plates 36—36 are provided with cam grooves 38—38 for the reception of rollers 40—40. Said rollers 40—40 are disposed at the lower extremities of pins 41—41, which pins are screw-threaded into the cross slides 31—31. It will be clear that longitudinal movement of the longitudinally movable slide 26 will, through the medium of brackets 32—32, rods 33—33, cam plates 36—36, rollers 40—40 and pins 41—41, communicate transverse movement to the cross slides 31. Said cross slides 31—31 are provided with tool holding members 42—42 (Fig. 6).

As mentioned above, the platen 24 is provided with an operating cylinder therefor. Said operating cylinder is shown in Figure 2 and bears the numeral 43. Said cylinder 43 is secured to the bed 20 by means of a bracket 44 and is provided with the piston 45 and the piston rod 46. The outer extremity of the piston rod 46 is screw-threaded and is adjustably secured, by means of the adjusting nuts 47—47, to a bracket 48 secured to the platen 24. As also mentioned above, the longitudinally movable slide 26 is adapted to be moved by a fluid pressure cylinder. Said fluid pressure cylinder is carried by the platen 24. Such a cylinder is illustrated in Figures 1, 2 and 3 and is indicated by the numeral 49. The piston rod extending from said cylinder 49 is indicated by the numeral 50 and is adapted to communicate movement through the adjusting nuts 51—51 to the bracket 52 secured to the longitudinally movable slide 26. According to the structure illustrated (Figs. 1 and 2), the slide 26 may be provided with the tool carrying member 53. Said member 53, according to the illustrated embodiment of the present invention, also provides supporting means for a pilot bar 54, which according to usual practice is adapted to ride within a cooperating aperture in a member carried by the headstock of the machine, to be referred to presently.

Referring now to Figures 1 and 3, the headstock of the lathe is indicated by the numeral 55, which headstock is adapted to communicate a turning movement to the chuck 56. An electric motor 57 is illustrated, mounted upon the headstock 55. Said electric motor is adapted, through power transmitting mechanism (not shown) located within the casing 57a, to drive the power transmitting mechanism within the headstock 55. The ratio of transmission of said power transmitting mechanism may be governed according to usual practice.

Fluid pressure (preferably oil pressure) may be communicated to the operating cylinder 43 for communicating movement to the platen 24 and the operating cylinder 49 for communicating movement to the slide 26. By means of the fluid pressure pump 58 (Figs. 1, 2 and 7), which pump is cooperatively associated with the fluid reservoir 59, fluid pressure is communicated to said operating cylinders 43 and 49 through pipe connections and control mechanisms which will be referred to hereinafter. Power is communicated to the fluid pressure pump 58 from the electric motor 57 through the power transmitting mechanism within the casing 57a, which power transmitting mechanism communicates power to the sprocket chain or belt 60 (Figs. 2, 3 and 7). Said sprocket chain or belt drives a sprocket 61 (Figs. 2 and 3), rotatably carried by the oil reservoir 59. Said sprocket 61 is fast to the shaft 62 (Figs. 2 and 7), which shaft is provided with the sprocket 63 (Figs. 2, 3 and 7). Said sprocket 63 drives the sprocket chain 64, which in turn drives the sprocket 65 connected to the pump 58. Said pump 58 is provided with the control valve 66, which control valve, as will be explained presently, controls the output of the pump 58 according to predetermined settings. Said pump 58 is also provided with the feed control lever 57, which, as will be explained presently, controls the feed of the cutting tool or tools during the feed portions of the stroke of said cutting tool or tools. Said control valve 66 is provided with the governing cylinder 68, which governing cylinder will operate in response to predetermined settings of instrumentalities to be described presently.

The base 25 is located relative to the platen 24 preferably by means of the key 69 (Fig. 5). Said key 69 is seated within cooperating slots 70 and 71 in the upper surface of the platen 29 and the lower surface of the base 25, respectively. Said key 69 is secured rigidly to the base 25 by means of screws 72. When the platen 24 and the base 25 are set up for machining the sliding surfaces thereof, it is a simple matter to machine the slots 70 and 71 of said platen 24 and base 25. Said slots 70 and 71 may therefore be accurately located, whereby the drilling of bolt holes for rigidly securing the base 25 to the platen 24 may be accomplished without precise accuracy. By reason of the expedient of keying the base 25 to the platen 24, the number of precise lining up operations in assembly is reduced.

The present invention contemplates a simple mechanism for limiting the stroke of the longitudinally movable slide 26. By reference to Figure 3 it will be noted that the rear head of the cylinder 49 is axially apertured for the reception of a setscrew 73. Said setscrew 73 is adapted to engage the piston 74 within said cylinder 49. By adjusting said setscrew 73, the limit of withdrawing movement of the piston 74 and the slide 26 may be adjusted as desired. A plug 75 may be threaded into the head of cylinder 49 to prevent leakage of fluid from within said cylinder 49.

The means for manually controlling the valve 66, which in turn controls the effect of the fluid pressure pump 58, will now be described. By reference to Figure 7 it will be noted that the valve 66 has extending therefrom the piston rod 76, which piston rod is, through the medium of the link 77, connected to the lever 78. Said lever 78 is keyed to the shaft 79 (Figs. 1 and 7). From an inspection of Figure 1 it will be noted that said shaft 79 extends parallel with the bed of the lathe and is provided with the handle 80 conveniently located adjacent to the region of the chuck 56. Said shaft 79 is swingingly carried by a plurality of brackets, indicated by the numerals 81, 82 and 83 (Fig. 1). As will be explained hereinafter, except during certain momentary periods no pressure of fluid is exerted upon the piston within the cylinder 68, and the operative, except during said momentary periods, may swing the handle 80 to control the position of the plunger within the valve 66.

The present invention contemplates means responsive to movement of the longitudinally movable slide 26 for automatically controlling said lever 78 to control the operation of valve 66. Swingingly carried by the shaft 79 is the arm 84, which arm is urged in a counter-clockwise direction as the parts are viewed in Figure 7 by means of the extensible strut 85, which has one of its extremities pivoted to said arm 84 to swing about the axis of the pin 86. The other extremity of the extensible strut 85 is provided with the adjusting nut 87, which may be locked in position by means of the lock nut 87'. Said extensible strut 85 extends through a bracket 88 mounted upon the pump 58. A spring 89 reacts between the bracket 88 and the adjusting nut 87 to exert a pull upon said extensible strut 85 to bias said arm 84 in a counter-clockwise direction as the parts are viewed in Figure 7. Said arm 84 is provided with a longitudinal slot 90, which slot may have overhanging walls 91—91, whereby one extremity of the extensible strut 92 may be swingingly clamped to said arm 84 at selected positions radially of said arm 84 with reference to the axis of swing of said arm 84, that is to say—with reference to the axis of the shaft 79. The other extremity of said extensible strut 92 is pivotally connected to the feed control lever 67 of the pump 58. Carried by the platen 24 is the bracket 93 (Fig. 1), which bracket is apertured to slide upon the rod 94. Said rod 94 is provided with two spaced collars 95 and 96, which may be adjustably secured to said rod 94. The left-hand extremity of said rod 94 is provided with a sleeve 97 adapted to be adjustably secured to said rod 94 by means of the setscrew 98 (Figs. 1 and 8). Said sleeve 97 has a bearing within the bracket 81. It will be clear that the bracket 93 has a lost motion connection with the rod 94 through the medium of the spaced apart collars 95 and 96. The parts may be so positioned that reciprocations of the platen 24 will result in reciprocations of lesser magnitude of the rod 94 and the sleeve 97. By reference to Figure 9 it will be noted that the arm 84 is provided with a pair of shoulders 99 and 100 spaced apart. Disposed within said shoulders is the tumbler 101. A spring 102 is provided for biasing said tumbler 101 in a counter-clockwise direction as the parts are viewed in Figure 8. Said tumbler 102 is adapted to seat itself against the arm 84 under the influence of said spring 102. Said tumbler 101 is provided with the rounded nose portion 103 adapted to be engaged by the beveled end portion 104 of the sleeve 97, which sleeve 97 is adjustably secured to the rod 94. Inasmuch as the tumbler 101 is spaced from the axis of swing of the arm 84, that is—spaced from the axis of the shaft 79, longitudinal movement of the sleeve 97 in a left-hand direction as the parts are viewed in Figure 8 will exert a swinging action upon said arm 78, moving same in a clockwise direction as the parts are viewed in Figure 7. Inasmuch as said arm 84 is connected through the extensible strut 92 to the control lever 67 of the pump 58, longitudinal movement of the platen 24 will, through the medium of collar 95, rod 94, beveled extremity 104 of the sleeve 97 and tumbler 101, communicate controlling movement to the control lever 67. It will be noticed that this control movement is in opposition to the biasing effect of the spring 89, which, through the medium of the bracket 88 and extensible strut 85, tends to urge the arm 84 in a counter-clockwise direction from that shown in Figure 7. As the sleeve 97 is carried along by movement of the platen 24, the arm 84 should preferably be held in position to govern the control lever 67. The present invention contemplates a construction, however, in which the control of the lever 67 is transferred from the platen 24 and sleeve 97 at the instant when the cylinder 49 becomes operative to move the longitudinally movable slide 26. By reference to Figure 8 it will be noted that the sleeve 97 is provided with the notch 105, which notch is defined by the square shoulder 106. Said square shoulder 106 of the sleeve 97 is adapted to cooperate with the square shoulder 107 of the tumbler 101. When the sleeve 97 has moved to a predetermined position in a left-hand direction as the parts are viewed in Figure 8, the square shoulder 107 of the tumbler 101 will clear the square shoulder 106 defining the notch 105, permitting the tumbler 101 to snap into the notch 105 and thereby permitting the spring 89 reacting upon the arm 84 to cause the movement of the speed control lever 67 to its extreme counter-clockwise direction as the parts are viewed in Figure 7.

By reference to Figures 1, 4, 5 and 6 it will be noted that the shaft 79 has secured thereto the arm 108, which arm is adapted to oscillate between bifurcations of the bracket 83. The upper extremity of the arm 108 (Figs. 1 and 6) engages within a slot 109 in a sliding member 110 slidably carried by the bracket 83. Said sliding member 110 is provided with an upstanding roller 111 (Figs. 1, 4 and 6) adapted to be engaged by a pair of adjustable cam members 112 and 113 carried on the under side of the sliding platen 24. It will be clear that said adjustable cam members 112 and 113 will, at the extremities of the travel of the platen 24, control the piston rod 76 of valve 66 through the medium of the roller 111, sliding member 110, arm 108, lever 78 and link 77 (Figs. 4, 5 and 6).

The fluid pressure circuits for communicating fluid pressure from the pump 58 to cylinders 43 and 49 of the platen 24 and slide 26 will now be described. As indicated above, Figures 10 and 11 (which are diagrammatic views showing circuit layouts) show alternative systems, Figure 10 representing a system of fluid pressure connections in which the means for operating the tool carrying slide 26 and cross slides 31 complete their retreating movements prior to the inauguration of the retreating movement of the platen 24, and Figure 11 representing a system in which the platen 24 is given a short retreating movement followed by complete retreating movements of the slide 24 and cross slides 31—31, after which the platen is withdrawn to its fully retreated position. It is entirely feasible to interconnect the system shown in Figure 10 with the system shown in Figure 11, whereby an operative may, by the operation of certain valves, control the relative actions of the platen 24 and slides 26 and 31—31 according to either the system disclosed in Figure 11 or the system disclosed in Figure 10, or according to any other predetermined system. Such an interlock between the systems disclosed in Figures 10 and 11 is disclosed in Figure 12.

Referring to Figures 7 and 10, it will be noted that the valve 66 has communicating therewith the three pipe connections 114, 115 and 116. Also communicating with the pump 58 is the pipe connection 117. Said pipe connection 114 connects through the pipe connection 118 with the right-hand end of the cylinder 68. For controlling said pipe connections 114, 115, 116, 117 and 118, a plurality of valves are provided, indicated by the numerals 119, 120, 121, 122 and 123. The valve 119 may be termed a relay and controls operation of the valve 120, which in turn controls access of fluid pressure to the governing cylinder 68. Referring to pipe connection 116, it will be noted that said pipe connection is provided with a branch 124 leading to a mid region of the valve or relay 119. Another branch 125 of said pipe connection 116 leads to the rear side of the platen operating cylinder 43. A branch 126 leads from said branch 125 to the upper side of the valve 123. Said valve 123 will be termed a resistance valve and the function of said valve will be explained presently.

Pipe connection 115 is provided with the branch 127, which leads to the valve 121, which valve 121 is also a resistance valve. Said pipe connection 115 is provided with another branch 128 leading to the valve 122, which is also a resistance valve. Said pipe connection 115 connects with the flexible pipe connection 129, which communicates with the forward side of the slide operating cylinder 49. It will be noted that the lower portion of the resistance valve 123 communicates with the rear end of operating cylinder 49 through the flexible pipe connection 130. It will also be noted that the lower portion of the resistance valve 122 connects through the pipe connection 131 with the forward side of the platen operating cylinder 43. The lower portion of the resistance valve 121 connects through the pipe connection 132 with a cylinder 133 located at one extremity of the valve 120. Located at the other extremity of the valve 120 is the cylinder 134, which through pipe connection 135 connects with the right-hand extremity of the valve or relay 119.

Pipe connection 114 leads not only to the pipe connection 118, but also to the left-hand end portion of valve 120. Branching from pipe connection 114 is the pipe connection 136, which leads to the left-hand end portion of valve or relay 119. Pipe connection 117 leads from the pump 58 to the mid region of the valve 120. The left-hand end portion of the cylinder 68 is connected through the pipe connection 137 to the left-hand end portion of the valve 120.

The pump 58 and its control valve 66 may take a form well known in commercial service. The details of said pump 58 and control valve 66 have not been illustrated or described herein, inasmuch as said details form no part of the present invention. Valves suitable for the purpose may be readily purchased in the open market. It need only be stated that said valve 66 controls the output of the pump 58 according to positions of the plunger 76 of said valve 66. Five selectable positions of said plunger 76 are indicated in Figures 5, 7, 10 and 11, said positions being as follows:

a—position for rapid traverse forward movement of platen 24 or slide 26;

b—position for feeding or cutting forward movement of platen 24 or slide 26;

c—neutral position for zero movement of platen 24 and slide 26;

d—position for feeding or cutting retreating movement of platen 24 or slide 26;

e—position for rapid traverse retreating movement of platen 24 or slide 26.

The rate of feeding movement either in a forward or a retreating direction may be, according to well known practice, controlled by operation of the control lever 67.

Referring now to a description of valve or relay 119, it will be noted that said valve comprises the cylinder wall 138, the cylinder heads 139—139, the plunger 140 and the spring 141. Said spring reacts against the cylinder head 139 and a nut 142 secured to the plunger 140 for urging the plunger 140 toward the left as the parts are viewed in Figures 10 and 11. Said plunger 140 is provided with the enlarged portions 143 and 144, which enlarged portions are spaced from one another to provide the annular recess 145. Said enlarged portions 143 and 144 are spaced from the extremities of the plunger 140 within the valve 119 to provide the annular recesses 146 and 147. The cylinder wall 138 is provided with the longitudinal recess 148 adapted to provide communication between the two extremities of the cylinder between the cylinder heads 139—139. It will be noted that pipe connection 136 communicates with the longitudinal recess 148 and therefor connects with the recess 146 at the left-hand end of plunger 140 at all times. By reason of the fact that longitudinal recess 148 communicates also with the right-hand end of the valve or relay 119, communication is had at all times from pipe connection 136 to the recess 147 at the right-hand end of plunger 140. Pipe connection 124 connects with the annular recess 145 at all times regardless of the position of the plunger 140. Pipe connection 135 communicates with the recess at the right-hand end of the plunger 140 when said plunger is at the left-hand end of its stroke as the parts are viewed in Figure 10. When said plunger 140 is at the right-hand end of its stroke, said pipe connection 135 is in direct communication with pipe connection 124 through the annular recess 145.

Referring now to a description of valve 120, it will be noted that said valve includes the cylinder wall 149. Said cylinder wall is closed at its two extremities by the heads 133 and 134 above mentioned, which heads are themselves cylinders. Slidably disposed within the cylinder wall 149 is the plunger 150 having the enlarged portions 151 and 152 spaced from one another and providing between them the annular recess 153. Said enlarged portions 151 and 152 are also spaced from the ends of the plunger 150 within the cylinder wall 149, whereby to provide the annular recesses 154 and 155. A longitudinal recess 156 provides communication between the two ends of the space within the cylinder wall 149. The plunger 150 is provided with the stems 157 and 158 extending from the two extremities thereof, which stems operate as pistons within the cylinders 133 and 134, respectively. Said stems 157 and 158 are adapted to alternatively react to pressure within the pipe connections 132 and 135 to cause reciprocating movement of the plunger 150.

The resistance valves 121, 122 and 123 are all alike in essentials, though in the practice of the present invention they will be calibrated to respond to different pressures. A description of one of said valves 121, 122 and 123 will suffice for a description of all of them. Referring particularly to valve 121, said valve comprises the cylinder wall 159 having the cylinder heads 160 and 161. The bore of the cylinder wall 159 is formed to provide the conical seat 162 for limiting movement in one direction of the plunger 163, which plunger 163 is shaped at one of its extremities to conform to said conical seat 162. A spring 164 is provided for urging the plunger 163 against the seat 162, the tension of which may be adjusted as for example by means of the adjusting screw 164a.

Said plunger 163 is provided with the enlarged portion 165 having a sliding fit within the cylinder wall 159. At one extremity of the enlarged portion 165 is the reduced portion 166 providing the annular recess 167. The plunger 165 is longitudinally slotted, as indicated by the numeral 168. Disposed axially of the plunger 163 is the bore 169, which, through the cross aperture 170, communicates with the longitudinal slot 168. A ball valve 171 resting on the upper surface of plunger 163 is adapted to close communication between aperture 169 and the space above the plunger 163. It will be noted that the space below the plunger 163 is in communication with the pipe connection 132 and the space above the plunger 163 is in communication with pipe connection 127. The interior construction and the connections to the resistance valves 122 and 123 will be clear from the description of resistance valve 121.

The extremity of plunger 140 of valve or relay 119 is adapted to be abutted by an abutment member 172, which may be carried in adjusted position by the pilot bar 54, whereby said abutment member 172 will be responsive to the position of the cutting tool or cutting tools of the lathe. When the tool holding member 53 is at the limit of its forward movement, abutment member 172 will be located in position to abut the extremity of plunger 140 to move said plunger to its right-hand position as the parts are viewed in Figure 10. At other times the spring 141 will bias the plunger 140 in its left-hand position as the parts are viewed in Figure 10.

Referring now to a description of the instrumentalities shown in Figure 11, a number of said instrumentalities are common with those shown in Figure 10. In explaining the functions of the system disclosed in Figure 11 it is necessary to discuss briefly the construction of the platen operating cylinder 43. It will be noted from an inspection of Figure 11 that said cylinder 43 includes the cylinder wall 173 having cooperating cylinder heads 174 and 175. Slidably disposed within the cylinder wall 173 is the piston 45 having its right-hand extremity reduced, as the parts are viewed in Figure 11, to provide the annular recess 177. Pipe connection 115 leads to the recess 177. Said pipe connection 115 is provided through the check valve 178 with the branch pipe connection 179, which communicates with the bore of the cylinder wall 173 at a region spaced a short distance from the cylinder head 175 through the pipe connection 180. When said piston 45 has moved a predetermined distance toward the left as the parts are viewed in Figure 11, communication is had between the pipe connection 115 and the pipe connection 180, shunting the check valve 178. Said branch pipe connection 179 continues through the flexible pipe connection 129 to the right-hand end of the cylinder 49 for operating the slide 26 as the parts are viewed in Figure 11. According to the system shown in Figure 11, pipe connection 116 is connected to the left-hand end of the platen operating cylinder 43 through the resistance valve 182. The resistance valve 182 may be similar in essentials to resistance valves 121, 122 and 123 referred to above, and need not be described in detail.

Figure 12:
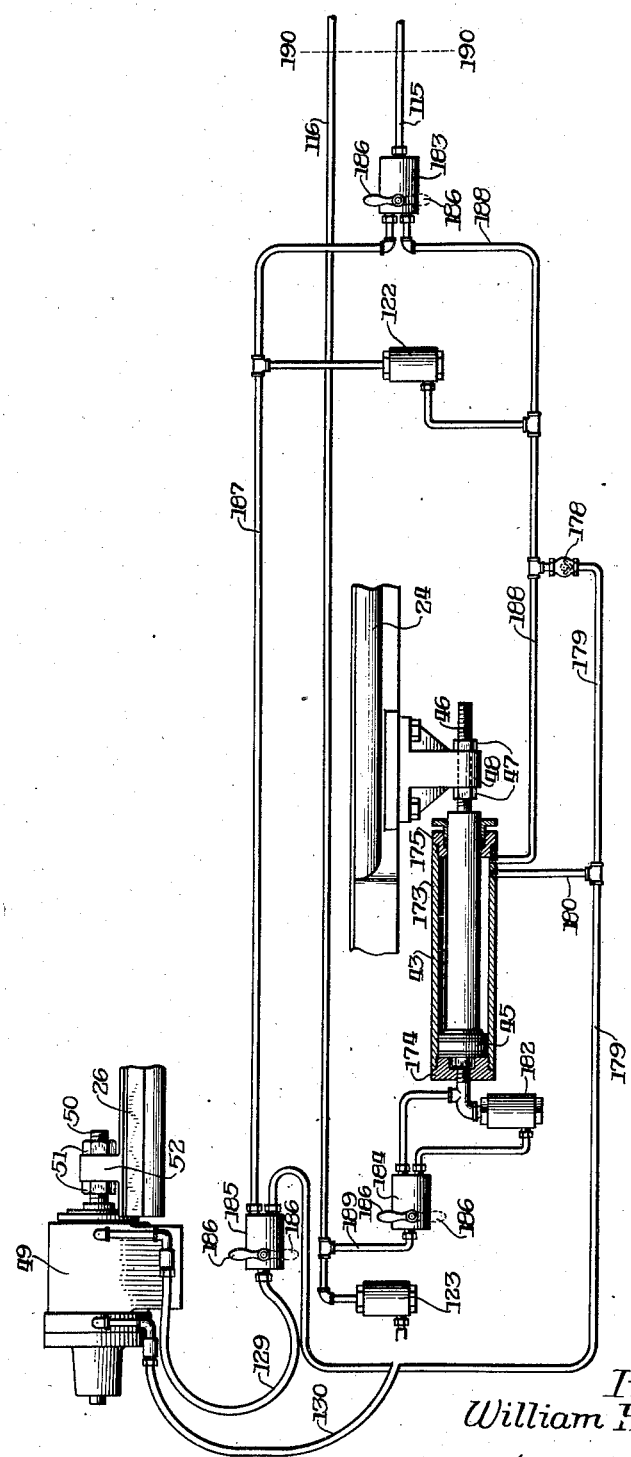
Figure 12 is a diagrammatic view of a system whereby the fluid pressure connections shown in Figure 10 or those shown in Figure 11 may be utilized at the option of the operative.

Referring now to a description of Figure 12, said figure represents diagrammatically the system whereby the operative, by control of certain valves, may cause operation according to the system disclosed in Figure 10 or according to the system disclosed in Figure 11. According to the system shown in Figure 12, three two-way valves are employed which bear the numerals 183, 184 and 185. Said valves are illustrated as being provided with handles 186—186. According to the layout shown in Figure 12, when said handles are in their uppermost positions the connections provide the system shown in Figure 10. When said handles are in their lowermost positions the connections provide the system shown in Figure 11. The circuit connections need not be described in great detail. It will be sufficient to point out that the pipe connection 115 leads to the two-way valve 183, from which the branch lines 187 and 188 extend. Said branch line 187 connects with one of the two selectable ports of the two-way valve 185. The other selectable port of said two-way valve 183 connects, through pipe connection 188, cylinder 43, pipe connection 180 and pipe connection 179, with the operating cylinder 43. In parallel with said pipe connection 180 and the passageway through cylinder 43 is the check valve 178. The resistance valve 122 is connected between the branch connections 187 and 188 communicating with the two selectable ports of the two-way valve 183. The forward extremity of the slide operating cylinder 49 is connected to the common port of the two-way valve 185 through the flexible connection 129. The common port of the two-way valve 184 is connected to the pipe connection 116 through the pipe connection 189. One of the two selectable ports of the two-way valve 184 connects directly to the left-hand end of the platen operating cylinder 43 and the other selectable port of the two-way valve 184 connects through the resistance valve 182 to the left-hand end of the platen operating cylinder 43.

A mode of operation of the above described instrumentalities is substantially as follows. A cycle may be said to start with the platen 24 and the slide 26 in their fully retreated positions. Said fully retreated positions need not necessarily be at the possible limits of travel of said platen 24 and slide 26, inasmuch as in commercial operation it is frequently advisable to stop the retreating movements of said platen and said slide short of the limits of said retreating movements. The limit of retreating movement of the slide 26 may be controlled by the adjustment of the setscrew 73 (Fig. 3), and the limit of retreating movement of the platen 24 may be controlled by adjustment of the cam member 113 (Figs. 4, 5 and 6) for causing the swinging arm 108 to move the plunger 76 of the valve 66 to neutral position (Figs. 5, 6 and 7). When the slide 26 is in fully retreated position, the cross slides 31—31 will also be in fully retreated positions.

With the platen 24, longitudinally movable slide 26 and cross slides 31—31 at rest in their retreated positions, the operative may remove the finished piece of work from the chuck 56 and may insert a new piece of work into said chuck. After the operative has operated an instrumentality (not shown) for causing rotation of the chuck 56, he will pull outwardly upon the handle 80, which will communicate a turning movement to shaft 79. There will be no fluid pressure opposition to turning movement of said shaft 79 at this time, and said shaft will remain in the position to which it is moved until positively moved by an instrumentality to be mentioned presently.

The outward pull upon the handle 80 communicates a clockwise rotation to shaft 79 as the parts are viewed in Figure 7, resulting in movement of the plunger 76 to the left as the parts are viewed in Figure 7. This movement locates the plunger 76 of valve 66 in position a (Figs. 5, 7, 10 and 11), which is the position for rapid traverse forward movement of the platen 24 or slide 26. Under these conditions, fluid pressure will be communicated from the pump 58 through the pipe connection 116 to the left-hand end of the platen operating cylinder 43, resulting in the forward movement of the platen 24. This rapid traverse movement will continue until the cam member 112 adjustably carried by the platen 24 engages roller 111 carried by the sliding member 110 (Figs. 4 and 5). Said cam member 112 will, through its engagement with the roller 111, move the sliding member 110 to the right as the parts are viewed in Figure 5, rocking the arm 108 and pulling the plunger 76 to position b (Figs. 5, 7, 10 and 11), which is the position for feeding or cutting movement of platen 24 or slide 26. If the operative desires to have the platen 24 move with a feeding speed, that is—with a restricted quantity of oil delivered by the pump 58, he will so adjust the cam 112 longitudinally of the platen 24 that said cam member 112 will operate the slide 110 at the desired point previous to the time that the piston 45 comes to the limit of its stroke in its cylinder 43. If on the other hand the operative does not desire to operate the platen 24 with a feeding speed, he will so adjust the cam member 112 longitudinally of the platen 24 that said cam member will not fully operate the sliding member 110 until piston 45 has reached substantially its limit of travel within the cylinder 43. While piston 45 is moving forward in cylinder 43, no forward movement is communicated to the piston within the slide operating cylinder 49 relative to said cylinder 49. Expressed in other language, the slide 26 is not moved relative to the cylinder 49 during the forward movement of the platen 24. The movement of slide 26 relative to the cylinder 49 is prevented by reason of the action of resistance valve 123. At the time that fluid pressure is being exerted through pipe connection 116 to the left-hand end portion of the platen operating cylinder 43, pressure is also communicated to the resistance valve 123. The spring within said resistance valve 123 will be chosen of such a value that said valve will not be opened at the pressure required for moving the piston 45 within the platen operating cylinder 43 whether said movement be in the rapid traverse movement of the platen 24 or in the feeding or cutting movement of platen 24. When, however, the piston 45 within the platen operating cylinder 43 reaches the end of its stroke and can proceed no further, pressure applied to resistance valve 123 builds up to a value sufficient to open said valve, whereby fluid pressure from pipe connection 116 (Fig. 10) is communicated through valve 123, through the flexible pipe connection 130, to the left-hand end portion of the slide operating cylinder 49. This pressure will communicate a forward movement to slide 26, which slide, as noted above, carries tools for operating upon the work within the chuck 56. It will be clear that pressure is exerted not only upon the piston within the slide operating cylinder 49, but also upon the piston 45 within the platen operating cylinder 43, the result being that the platen 24 is held firmly at the forward limit of its movement without any special clamping mechanism, whereby the tools carried by the slide 26 may efficiently perform their cutting operations.

Movement of the slide 26 is accompanied by transverse movements of the cross slides 31—31 by reason of the pin and cam slot connection between said slide 26 and said cross slides 31—31. It will be clear that by varying the design of the cam slots 38—38 in the cam plates 36—36, the speed of and range of movement of the cross slides 31—31 may be predetermined relative to the speed and range of movement of the slide 26.

The present invention contemplates means for varying the output of the pump 58 at substantially the instant that the forward movement of the platen 24 ceases and forward movement of the slide 26 starts. In explaining this action reference may be had to Figures 1, 7, 8 and 9. By reference to Figure 1 it will be noted that the platen 24 has a lost motion connection with the rod 94, the bracket 93 of said platen 24 being adapted to engage collars 95 and 96 of said rod 94 in the reciprocating movements of said platen 24. When the platen 24 reaches a predetermined point in its forward movement, the bracket 93 carried by said platen 24 will engage the collar 95, moving said collar forward and moving the rod 94 forwardly. By reference to Figure 8 it will be noted that the forward extremity of the rod 94 is provided with the sleeve 97 adapted to have a camming action upon the tumbler 101. By reference to Figure 7 it will be noted that as the sleeve 97 advances, that is—as it approaches the observer as the parts are viewed in Figure 7, the camming surface 104 of sleeve 97 will engage tumbler 101, which at this time (Fig. 8) is held at the limit of its rotation in a counter-clockwise direction by means of the spring 102. Camming action of sleeve 97 will communicate a turning movement to the lever 84, moving same in a clockwise direction as the parts are viewed in Figure 7. This will communicate movement to the lever 67 (Fig. 7), which will control the feeding action of the pump 58. This controlling action will be so chosen as to give the platen 24 a forward feeding movement at the desired speed. It will be understood that this modification in the action of the pump 58 will be required by reason of the transition from rapid traverse forward movement to forward feeding or cutting movement. The parts are so designed that when the platen gets to the limit of its forward movement, the tumbler 101 will snap past the shoulder 106 of the sleeve 97, permitting the counter-clockwise movement of the arm or lever 84, automatically adjusting the control lever 67. The shoulder 106 will be so positioned that the adjusting action just referred to of the lever 67 will occur at the instant that the pressure in the control valve 123 permits access of fluid pressure from the pipe connection 116 to the left-hand end portion of the slide operating cylinder 49 (Fig. 10). By reason of this construction the output of the pump 58 will be controlled at the instant that feeding action of the slide operating cylinder 49 is started. It will be understood that modification of the output of the pump 58 at this time is of advantage in the event that there are any differences in the design of the operating cylinders 43 and 49, and also in the event that a different speed of feeding or cutting movement is desired in the slide 26 than is desired in the platen 24. Modification of the output of the pump 58 is also desirable at this time to compensate for leakage (which is of course inevitable to a greater or lesser extent), which leakage will be increased when the piston in cylinder 43 and the plunger within valve 123 are at the limits of their movements.

Forward movement of the slide 26 may be limited by action of the abutment 172, which co-operates with the plunger 140 of valve or relay 119. As will be explained presently, the action of the abutment 172 may take place at the instant that the plunger of cylinder 49 is at the forward limit of its stroke in the event that it is desired to accurately adjust the forward travel of the slide 26. Such accurate control is essential, for example, when a tool is to cut up to a shoulder. Under other conditions it may not be so important to stop the forward movement of the slide 26 at an accurately predetermined point.

Referring first to conditions under which accurate predetermining of stoppage of forward movement of the slide 26 is not essential, it may be explained, reference being had to Figure 10, that as the bar 54 carried by the slide 26 moves forwardly, the abutment 172 carried by said bar will approach the adjacent extremity of the plunger 140 of the valve 119. The spring 141 normally holds the plunger of valve or relay 119 in its left-hand extreme position as the parts are viewed in Figures 10 and 11. At this time, pressure within the pipe connection 116 communicates, through the branch connection 124, with a dead space between the enlarged portions 143 and 144 of the valve or relay 119. At this time also pipe connection 117 communicates with a dead space between the enlarged portions 151 and 152 of the control valve 120. Said pipe connections 116 and 117 are therefore inoperative to move the plungers in said valves 119 and 120. At this time, the other pipe connections connecting to the control cylinder 68 of the pump 58 are not under pressure. When the abutment 172 engages the extremity of the plunger 140 of valve or relay 119, said plunger is moved to the right as the parts are viewed in Figures 10 and 11, permitting communication between the branch pipe connection 124 and the pipe connection 135. Inasmuch as the fluid within pipe connection 116 is under pressure at this time, said pressure will be communicated through the branch connection 124 to pipe connection 135, which will move the plunger in valve 120 toward the left as the parts are viewed in Figures 10 and 11. This action allows the fluid under pressure in pipe connection 117 to be communicated to the pipe connection 137. Said fluid pressure is therefore allowed to move the plunger within the control cylinder 68 toward the right as the parts are viewed in Figures 10 and 11, moving the plunger 76 of the control valve 66 to position e, which is the position for rapid traverse movement in a retreating direction.

Referring now to conditions in which it is required that the tool carrying slide 26 be brought accurately to a predetermined position before reversal, it may be explained that the slide 26, by manipulation of the nuts 51—51 on the screw-threaded extremity of the plunger 50, may be so positioned relative to the piston within the operating cylinder 49 that the slide 26 may be brought to the accurate position referred to at the instant that the plunger within the cylinder 49 reaches the end of its stroke in a forward direction; or, the tools carried by the slide 26 (and by the cross slides 31—31) may be so positioned that they reach the predetermined extremities of their cutting stroke at the instant that the plunger within cylinder 49 reaches the limit of its forward movement; or, if preferred, instead of utilizing the piston and the cylinder head of cylinder 49 to form the positive abutting members, any other preferred abutments may be utilized for stopping the forward movement of the slide 26 at a predetermined point. Ordinarily, when the forward limit of the cutting or feeding stroke of the slide 26 is to be accurately predetermined, it is desirable to hold said slide 26 at said limit of its movement for a predetermined time, sufficient to allow the chuck 56 to make one or more complete revolutions. The present invention contemplates structure for accomplishing this purpose. The length of time that the slide 26 will remain at the forward limit of its feeding or cutting movement depends, of course, upon the length of time required for reversal of the control valve 66 of the pump 58. This time element may be varied by controlling the effective area of the ports permitting communication between the pipe connections 124 and 135 (Figs. 10 and 11). If the delayed action referred to is desired, the abutment 172 will be so positioned upon the rod 54 that when the slide 26 is at its predetermined forward limit of movement, said abutment 172 will hold the plunger 140 in such a position that only a relatively small area of communication is had between pipe connections 124 and 135, whereby the action of the plunger within the control valve 120 will be delayed, which in turn will delay the action of the control valve 66 of the pump 58, thereby allowing the chuck 56 to make the requisite number of turns while the slide 26 is at the forward limit of its movement. By reason of this construction, the cutting action of the tools carried by the slide 26 and the cross slides 31—31 may be accurately predetermined at the forward limit of the movements of said slides.

As mentioned above, the pressure within pipe connection 116 will have communication through branch pipe connection 124 and pipe connection 135 with the right-hand extremity of the plunger within the control valve 120, which in turn permits fluid pressure within the pipe connection 117 to communicate with the pipe connection 137 to move the plunger of valve 66 to position e, which is the rapid traverse retreating movement. At this time pressure will be communicated through the pipe connection 115 directly (according to the layout of Figure 10) to the right-hand end portion of the slide operating cylinder 49, resulting in a retreating movement of the slide 26. As explained above, Figure 10 represents the system of connections which will be used when the completion of the forward cutting movement of the slide 26 and the corresponding cross cutting movements of slides 31—31 is to be followed by the withdrawal of the cross slides 31—31 before the platen 24 has retreated. Under these conditions (that is—under the layout shown in Figure 10), the retreat of the slide 26 will be accompanied by the withdrawal of abutment 172 from abutting relationship with the plunger 140 of valve or relay 119, allowing the plunger of said valve or relay 119 to move to its neutral position, as shown in Figure 10, under the influence of the spring 141. At this time there is no pressure opposing the action of the spring 141, the pressure applied to the inner surfaces of the enlarged portions 143 and 144 being balanced.

Pressure communicated to the right-hand end portion of the operating cylinder 49 will cause the piston within said operating cylinder 49 to move to the left-hand limit of its range of movement as the parts are viewed in Figure 10. When said plunger has reached the limit of its movement the pressure within pipe connection 115 will build up to a sufficient extent to open the resistance valve 122, permitting pressure within the pipe connection 115 to communicate through said valve 122 and pipe connection 131 to the right-hand end portion of the operating cylinder 43 as the parts are viewed in Figure 10. Resistance valve 121 is so designed relative to resistance valve 122 that said valve 121 will open at a lower pressure than that required to open resistance valve 122. Therefore it is assured that prior to the time that pressure is communicated from pipe connection 115 to the right-hand end portion of the operating cylinder 43, pressure within pipe connection 115 will be communicated to the left-hand portion of the control valve 120 as the parts are viewed in Figure 10, moving the plunger of said control valve 120 to the right as the parts are viewed in Figure 10. Under these conditions the enlarged portion 151 of the plunger of the valve 120 cuts off communication between pipe connection 117 and pipe connection 137, thereby relieving pressure within the control cylinder 68 of the valve 66. It will be noted that at this time communication is had between the pipe connection 137 and the drain line 114.

The communication of the pressure within pipe connection 115 to the right-hand end portion of the operating cylinder 43 will result in the retreating movement of the platen 24, which retreating movement will continue until adjustable cam member 113 (Fig. 4) engages the roller 111 carried by the sliding member 110 (Figs. 5 and 6). Inasmuch as the sliding member 110 is connected to the plunger 76 through the lever 108 and link 77, movement of said sliding member 110 will be communicated to the plunger 76. The camming surface of the cam member 113 will move the plunger 76 through the feeding position d for retreating movement to the neutral position c. The camming surface of the cam member 113 should extend well beyond the region necessary to move the roller 111 and consequently the plunger 76 to a neutral position, thereby insuring that, without the necessity for accurate adjustment, the parts will be brought to rest after the retreating movement of the platen 24 has been accomplished.

Figure 10 represents a layout or system of connections in which it is not necessary to withdraw the cross slides 31—31 before the platen 24 is withdrawn. Figure 11 contemplates a system of connections which will prevent the scoring of a finished face of the work within the chuck 56. According to Figure 11, after the forward cutting movements of the slide 26 and cross slides 31—31 have been completed, the platen 24 will be withdrawn a short distance in order to withdraw the cutting tools from the work within the chuck 56, after which the slide 26 and cross slides 31—31 will be withdrawn to their fully retreated positions relative to the platen 24, after which the platen 24 will be withdrawn to its fully retreated position. According to the layout in Figure 11, when the abutment 172 has moved the plunger 144 to its extreme right-hand position, pressure will be communicated through pipe connection 116, branch connection 124, to pipe connection 135, which will move the plunger of valve 120 to its extreme left-hand position. Under these conditions, pressure is communicated through pipe connection 117 to pipe connection 137, which will cause movement of the plunger within the control cylinder 68 toward the right as the parts are viewed in Figure 11, moving the plunger 76 of the control valve 66 to position e. Under these conditions, fluid will be delivered by the pump 58 to the pipe connection 115. Said fluid pressure cannot pass the check valve 178, and therefore, at this time, cannot communicate with the right-hand end portion of the slide operating cylinder 49. Pressure within pipe connection 115, however, communicates with the right-hand end portion of the platen operating cylinder 43. When the piston within the cylinder 43 is at the right-hand or forward limit of its stroke, communication between said cylinder 43 and the pipe connection 179 is interrupted by the piston within cylinder 43. After pressure within the pipe connection 115 has moved the piston within cylinder 43 a short distance to the left as the parts are viewed in Figure 11, communication will be opened between pipe connection 115 and pipe connection 179, whereby pressure from within pipe connection 115 will be communicated through the flexible pipe connection 129 to the right-hand end portion of the slide operating cylinder 49. Fluid on the left-hand side of the piston within the operating cylinder 43, in order to pass the resistance valve 182, must build up to a sufficient value to overcome the effect of the spring 164 within said resistance valve 182. The parts will be so designed that retreating movement of the piston within operating cylinder 49 will be accomplished at less pressure than is required to open the resistance valve 182, the result being that when communication is established between pipe connection 115 and pipe connection 179 through the cylinder 43, the piston within the cylinder 43 will remain stationary while the piston within the slide operating cylinder 49 is traveling toward the left-hand limit of its stroke. When the piston 49 has reached the limit of its stroke, which is to say—when the slide 26 and its corresponding cross slides 31—31 have been fully withdrawn, the pressure within the cylinder 43 will build up sufficiently to cause the opening of resistance valve 182, permitting escape of fluid from the left-hand end portion of cylinder 43 through resistance valve 182 and pipe connection 116 to the pump 58.

As stated above, Figure 12 represents a digramatic system or layout of pipe connections whereby the operative may at his option establish the system according to Figure 10 or the system according to Figure 11. It is to be noted that the two systems shown in Figures 10 and 11 are identical with each other from the right-hand extremities of said diagrams up to the region indicated in each of said diagrams by the broken lines 190—190. By manipulation of the handles 186—186, the system of pipe connections shown in Figure 12 may be controlled to correspond with the layout of Figure 10 or Figure 11. If the operative desires to operate the platen 24 and slides 26 and 31 according to the system disclosed in Figure 10, he will move the operating handles 186—186 of the valves 183, 184 and 185 to predetermined positions, indicated in Figure 12 as the uppermost positions of said handles. Under these conditions, communication will be established from the pipe connection 116 through the valve 184 to the upper pipe connection communicating with the left-hand end portion of the platen operating cylinder 43 (Fig. 12). Communication under these conditions is also established between pipe connection 115 and the upper pipe connection leading to the valve 185, which connects with flexible pipe connection 129.

When the operative desires to establish the system or layout illustrated in Figure 11, he will throw the handles 186—186 of valves 183, 184 and 185 to their lowermost positions, indicated in dotted lines in Figure 12. Under these conditions communication is established between pipe connection 116 through pipe connection 189 and valve 184 to the resistance valve 182. Communication is also established between the pipe connection 115 and pipe connection 188 to the right-hand end portion of the operating cylinder 43. Communication is also established between flexible pipe connection 129 and pipe connection 179.

By moving the handles 186—186 selectably to their uppermost positions or to their lowermost positions, the operative may establish either the layout illustrated in Figure 10 or the layout illustrated in Figure 11. Explaining in other language the selectable connections which may be made at the option of the operative, it may be stated that if said operative desires to operate his lathe according to the layout of Figure 10, he will move the handles 186—186 of valves 183, 184 and 185 to their uppermost positions. For forward movement of the platen 24 and slide 26 and cross slides 31—31, pressure from the pump 58 will be communicated to the pipe connection 116 through the valve 184 directly to the left-hand end portion of the platen operating cylinder 43. At this time resistance valve 123 will prevent communication of pressure to the left-hand end portion of the operating cylinder 49 connected to the slide 26. Under these conditions, therefore, the piston within the operating cylinder 43 will move forward with a rapid traverse movement, carrying with it the platen 24. Fluid on the right-hand side of the piston within the operating cylinder 43 will be delivered through the pipe connection 188 to the resistance valve 122, passing upwardly past the ball valve 171 within said resistance valve 122 to the valve 183 and out through pipe connection 115 to the pump 58. When the platen 24 has moved forwardly to the end of its stroke, pressure within the pipe connection 116 will build up to a sufficient extent to force open the resistance valve 123, allowing pressure to be communicated from pipe connection 116 to the flexible pipe connection 130, to the left-hand end portion of the slide operating cylinder 49. As the piston within cylinder 49 moves forward, fluid is delivered through the flexible connection 129 through valve 185 and valve 183 to pipe connection 115. After the slide 26 has moved to its limit in a forward direction and instrumentalities above described have been operated to apply pressure to pipe connection 115, and assuming that the handles 186—186 have all been disposed in their uppermost positions corresponding to the layout illustrated in Figure 10, pressure within pipe connection 115 will be communicated through valve 185 to the flexible pipe connection 129, to the right-hand end portion of operating cylinder 49, moving the piston within said cylinder 49 toward the left as the parts are viewed in Figure 12. Fluid is delivered from the left-hand end portion of the slide operating cylinder 49 through the flexible pipe connection 130 past the ball valve 171 within the resistance valve 123 to the pipe connection 116 leading to the pump 58. At this time pressure within the pipe connection 115 is prevented by the resistance valve 122 from communicating with the right-hand end portion of the platen operating cylinder 43. Therefore, the platen 24 will remain stationary until the piston within the slide operating cylinder 49 has reached the limit of its movement in a retreating direction. When the fully retreated position of the slide 26 has been reached, pressure within pipe connection 115 will build up sufficiently upon the resistance valve 122 to open same, after which pressure will be communicated from pipe connection 115 through resistance valve 122 to the right-hand end portion of the platen operating cylinder 43. Under these conditions, fluid on the left-hand side of the piston within the operating cylinder 43 will be delivered through valve 184 to pipe connection 116 back to the pump 58.

Assuming now that the handles 186—186 have all been disposed in their lowermost positions corresponding to the layout shown in Figure 11 and assuming that the slide 26 and the platen 24 are at the limits of their movement in forward or feeding direction, and assuming further that the instrumentalities have been operated to apply pressure to the pipe connection 115, pressure from within pipe connection 115 will be communicated to the pipe connection 188. Fluid within said pipe connection 188 cannot pass check valve 178. Under these conditions, pressure is communicated from pipe connection 115 through pipe connection 188 to the right-hand end portion of cylinder 43, moving the piston within said cylinder 43 a short distance toward the left as the parts are viewed in Figure 12, until the port communicating with pipe connection 180 is uncovered. The short movement of the piston within the operating cylinder 43 withdraws the platen 24 a short distance. After the port communicating with pipe connection 180 has been uncovered, fluid from pipe connection 115 may pass through the cylinder 43 to pipe connection 180, through pipe connection 179 to flexible connection 129 leading to the right-hand end portion of the slide operating cylinder 49. It will be noted that the fluid on the left-hand side of the piston within cylinder 43 is opposed by the resistance of the resistance valve 182. The resistance of said resistance valve 182 will be chosen of such a value that said piston will not be moved by the pressure communicated through pipe connection 180, said pressure instead being communicated through the pipe connection 180 and pipe connection 179 to the right-hand end portion of cylinder 49. Therefore, the piston within the operating cylinder 49 will operate, withdrawing the slide 26 while the platen 24 is held stationary. When the piston within the operating cylinder 49 has reached the end of its stroke, the pressure within pipe connection 115 will build up to a sufficient value to force the fluid on the left-hand side of the piston 45 of operating cylinder 43 through the resistance valve 182 to valve 184, whence said fluid will pass out through the pipe connection 116 back to the pump 58.

It will be noted that the present invention provides a system having a movable platen and a tool carrying slide movable relatively to said platen, said platen and slide each being provided with an operating fluid pressure responsive cylinder, which cylinders receive their fluid under pressure from a common source. Communication to the operating cylinders for said slide and said platen is selectably controlled whereby when one of said cylinders is operative the other is inoperative, whereby the danger of uncertain action of said cylinders is obviated. The present invention provides a system permitting positive control of the platen and tool carrying slide, whereby the highest degree of precision may be readily accomplished. The present invention provides a lathe which is sturdy, easily adjusted and not likely to get out of order, and in which delays in operation may be reduced to a minimum.

Though a preferred embodiment of the present invention has been described in detail, many modifications will occur to those skilled in the art. It is intended to cover all such modifications that fall within the scope of the appended claims.

What is claimed is—

1. In a lathe, in combination, a movable platen, a fluid pressure responsive cylinder for operating said platen, a tool slide carried by said platen, a fluid pressure responsive cylinder carried by said platen for operating said tool slide, a common source of pressure for said cylinders, a manually operable control valve for controlling the output of said source of pressure, means for selectably and alternatively controlling the connection of said cylinders with said source, means carried by said platen for operating said control valve to control the output from said source to said platen operating cylinder, means responsive to the position of said tool carrying slide for operating said valve to cause a reversal in the output of said source, and resistance valves for controlling the sequence of movements of said slide and said platen.

2. In a machine tool, in combination, a platen, an operating cylinder for said platen, a tool slide carried by said platen, an operating cylinder for said tool slide, said last mentioned operating cylinder being carried by said platen, pistons within said cylinders, a source of fluid pressure, a control valve for controlling the output of said source, connections between said source and said cylinders, a resistance valve in said connections for preventing access from said source to said tool slide operating cylinder until the piston within said platen operating cylinder has reached a predetermined position in its movement within its cylinder, and relay means operative when said tool slide is in a predetermined position for operating said control valve for reversing the direction of the output from said source.

3. In a machine tool, in combination, a platen, an operating cylinder for said platen, a tool slide carried by said platen, an operating cylinder for said tool slide, said last mentioned operating cylinder being carried by said platen, pistons within said cylinders, a source of fluid pressure, a control valve for controlling the output of said source, connections between said source and said cylinders, a resistance valve in said connections for preventing access from said source to said tool slide operating cylinder until the piston within said platen operating cylinder has reached a predetermined position in its movement within its cylinder, relay means operative when said tool slide is in a predetermined position for operating said control valve for reversing the direction of the output from said source, and manual means for moving said control valve except when said tool slide is in said predetermined position.

4. In combination, a movable platen, an operating cylinder therefor, a tool slide carried by said platen, an operating cylinder for said tool slide, said tool slide operating cylinder being carried by said platen, a common source of fluid pressure for said cylinders, a valve for controlling the output of said source, operating means for said control valve for connecting said source to said platen operating cylinder and to said slide operating cylinder, said slide operating cylinder being provided with valve means for preventing access between said source and said slide operating cylinder until the pressure within said platen operating cylinder has built up to a predetermined value, means responsive to movement of said platen for operating said valve to control the speed of said platen, and relay means adapted when said tool slide is in a predetermined position to move said control valve to cause reversal of flow from said source of fluid pressure.

5. In combination, a movable platen, an operating cylinder therefor, a tool slide carried by said platen, an operating cylinder for said tool slide, said tool slide operating cylinder being carried by said platen, a common source of fluid pressure for said cylinders, a valve for controlling the output of said source, operating means for said control valve for connecting said source to said platen operating cylinder and to said slide operating cylinder, said slide operating cylinder being provided with valve means for preventing access between said source and said slide operating cylinder until the pressure within said platen operating cylinder has built up to a predetermined value, means responsive to movement of said platen for operating said valve to control the speed of said platen, relay means adapted when said tool slide is in a predetermined position to move said control valve to cause reversal of flow from said source of fluid pressure, and means carried by said platen for moving said control valve to a neutral position to stop flow of fluid from said source to said cylinders.

6. In a machine tool, in combination, a source of fluid pressure, a control valve for controlling the output of said source, said control valve having a plurality of operative positions for controlling the delivery of fluid from said source, a sliding member, a fluid pressure responsive cylinder for operating said sliding member, connections between said cylinder and said source whereby in accordance with the positioning of said valve said source may through the medium of said cylinder alternatively communicate rapid traverse movements, feeding movements or zero movement to said sliding member, a secondary control member for controlling the speed of said feeding movements, and means responsive to said sliding member for controlling said secondary control member.

7. In a machine tool, in combination, a platen, an operating cylinder therefor, a tool carrying slide carried by said platen, an operating cylinder for said tool carrying slide, said last mentioned operating cylinder being carried by said platen, a source of fluid pressure, a control valve for controlling the output of said source of fluid pressure, said control valve having a plurality of selectable positions for selectably communicating rapid traverse, feeding or zero movement to said platen and said slide, a secondary control member for controlling the output of said source during the feeding movements of said platen and said tool carrying slide, and means having a lost motion connection with said platen for moving said secondary control member.

8. In a machine tool, in combination, a pair of sliding members, an operating cylinder for each of said sliding members, a common source of fluid pressure, control means for controlling the delivery of fluid from said source to said cylinders, said control means including a resistance valve for preventing the delivery of fluid from said source to one of said cylinders until the pressure in the other of said cylinders has risen to a predetermined value, and means operative at substantially the instant that pressure in said other cylinder has risen to said predetermined value for modifying the output delivered by said source.

9. In a machine tool, in combination, a first sliding member, an operating cylinder therefor, a second sliding member, an operating cylinder therefor, a source of fluid pressure, a control valve for controlling the output of said source, pipe connections leading from said source to said cylinders and adapted to communicate pressure in parallel circuits to said cylinders, resistance means responsive to the building up of pressure within said operating cylinder for said first sliding member for controlling communication between said source and the operating cylinder for said second sliding member, and means movable with said first sliding member for controlling said valve to modify the output of said source when communication is established between said source and said operating cylinder for said second sliding member.

10. In a machine tool, in combination, a sliding platen, an operating cylinder therefor, a tool slide carried by said platen, an operating cylinder for said tool slide, said last mentioned operating cylinder being carried by said platen, a source of fluid pressure, control means for controlling the delivery of fluid from said source, said source being connected to said cylinders to apply fluid under pressure to said cylinders in parallel circuits, and valve means responsive to pressure within said platen operating cylinder for controlling communication between said source and said slide operating cylinder.

11. In a machine tool, in combination, a sliding platen, an operating cylinder therefor, a tool slide carried by said platen, an operating cylinder for said tool slide, said last mentioned operating cylinder being carried by said platen, a source of fluid pressure, control means for controlling the delivery of fluid from said source, said source being connected to said cylinders to apply fluid under pressure to said cylinders in parallel circuits, valve means responsive to pressure within said platen operating cylinder for controlling communication between said source and said slide operating cylinder, and lost motion connecting means between said platen and said control means for modifying the amount of fluid delivered from said source to said cylinders when said slide operating cylinder is connected to said source.

12. In a machine tool, in combination, a platen, an operating cylinder for said platen, a tool slide, an operating cylinder for said tool slide, said last mentioned operating cylinder being carried by said platen, a pump, a control valve for controlling the output of said pump, a secondary control member for controlling the speed of delivery of fluid from said pump, means for controlling said control valve, means for controlling said secondary control member, said last mentioned means including means for biasing said control member to a predetermined position, and means movable with said platen for operating said control member in opposition to said biasing means.

13. In combination, a fluid pump, a control valve for said pump for controlling the output thereof, a secondary control member for controlling the speed of delivery of fluid from said pump, a swingingly mounted arm, and adjustable strut connecting said arm to said secondary control member, a platen, a cam member adapted to be moved in response to reciprocations of said platen, and a spring-pressed tumbler carried by said arm and adapted to cooperate with said cam member whereby said secondary control member is operated in response to movement of said platen.

14. In combination, a first sliding member, an operating cylinder therefor, a second sliding member, an operating cylinder therefor, a fluid pressure pump, a control valve for controlling the output of said pump, means responsive to movement of said first sliding member for governing said control valve, connections between said pump and said cylinders for applying pressure to said cylinders in parallel, valve means for controlling the communication of pressure from said pump to the operating cylinder for said second slide in response to the pressure developed within the operating cylinder for said first slide.

15. In combination, a first sliding member, an operating cylinder therefor, a second sliding member, an operating cylinder therefor, a fluid pressure pump, a control valve for controlling the output of said pump, means responsive to movement of said first sliding member for governing said control valve, connections between said pump and said cylinders for applying pressure to said cylinders in parallel, valve means for controlling the communication of pressure from said pump to the operating cylinder for said second slide in response to the pressure developed within the operating cylinder for said first slide, and means operating synchronously with said first slide for modifying the rate of delivery of said pump when pressure from said pump is communicated to said operating cylinder for said second slide.

16. In combination, a first sliding member, an operating cylinder therefor, a second sliding member, an operating cylinder therefor, a fluid pressure pump, a control valve for controlling the output of said pump, means responsive to movement of said first sliding member for governing said control valve, connections between said pump and said cylinders for applying pressure to said cylinders in parallel, valve means for controlling the communication of pressure from said pump to the operating cylinder for said second slide in response to the pressure developed within the operating cylinder for said first slide, and means operating in response to movement of said first slide for modifying the rate of delivery of said pump when pressure from said pump is communicated to said operating cylinder for said second slide.

17. In combination, a platen, an operating cylinder therefor, a tool slide carried by said platen, an operating cylinder for said tool slide, a pump, a control valve for controlling the output of said pump, a secondary control member for controlling the speed of delivery of fluid from said pump, connections between said pump and said cylinders for applying fluid pressure from said pump to said cylinders in parallel, valve means for controlling the connection of said slide operating cylinder with said pump in response to the pressure within said platen cylinder, and means for operating said secondary control member with a snap action when pressure is communicated from said pump to said slide operating cylinder.

18. In combination, a platen, an operating cylinder therefor, a tool slide carried by said platen, an operating cylinder for said tool slide, a pump, a control valve for controlling the output of said pump, a secondary control member for controlling the speed of delivery of fluid from said pump, connections between said pump and said cylinders for applying fluid pressure from said pump to said cylinders in parallel, valve means for controlling the connection of said slide operating cylinder with said pump in response to the pressure within said platen cylinder, and means for operating said secondary control member with a snap action when pressure is communicated from said pump to said slide operating cylinder, said means including a spring-pressed tumbler and a cam member, said cam member being movable in response to movement of said platen.

19. In combination, a platen, an operating cylinder therefor, a tool slide carried by said platen, an operating cylinder for said tool slide, a pump, a control valve for controlling the output of said pump, a secondary control member for controlling the speed of delivery of fluid from said pump, connections between said pump and said cylinders for applying fluid pressure from said pump to said cylinders in parallel, valve means for controlling the connection of said slide operating cylinder with said pump in response to the pressure within said platen cylinder, and means for operating said secondary control member with a snap action when pressure is communicated from said pump to said slide operating cylinder, said means including a spring-pressed tumbler and a cam member, said cam member being movable in response to movement of said platen, said cam member and said spring-pressed tumbler having cooperating abrupt shoulders, said tumbler being adapted to swing out of abutting relationship with said cam member when pressure is applied to said abrupt shoulders.

20. In a lathe, in combination, a platen, an operating cylinder therefor, a slide carried by said platen, an operating cylinder for said slide, said last mentioned operating cylinder being carried by said platen, a source of fluid pressure, means for connecting said source to said cylinders in parallel, said slide operating cylinder being connected to said source through a resistance valve, said valve being operative to prevent access of fluid from said source to said slide operating cylinder until the piston within said platen operating cylinder has reached the end of its stroke, whereby said piston within said platen operating cylinder will be clamped in position during the operation of said slide operating cylinder.

21. In a lathe, in combination, a platen, an operating cylinder for said platen, a slide carried by said platen, an operating cylinder for said slide, a common source of pressure for said cylinders, means responsive to pressure within said platen operating cylinder for controlling communication between said source and said slide operating cylinder, and means operating with a snap action for controlling the delivery of fluid from said source substantially synchronously with the inauguration of communication between said source and said slide operating cylinder.

22. In combination, a reciprocable member, an operating cylinder therefor, a source of fluid pressure, a control valve for controlling the output of said source, a relay adapted to be operated by said reciprocable member at one limit of movement of said reciprocable member, a valve for governing operation of said control valve adapted to be moved in response to said relay, means responsive to the output pressure of said source for returning said governing valve to initial position, and an adjustable resistance valve interposed between said source and said governing valve whereby the return action of said governing valve may be predetermined.

23. In combination, a reciprocable member, an operating cylinder therefor, a source of pressure, a control valve for controlling the output of said source, a governing valve having a pair of selectable positions for determining the position of said control valve, a relay responsive to the position of said reciprocable member for moving said governing valve to one of said selectable positions, and means responsive to the output pressure of said source for moving said governing valve to the other of said selectable positions, said last mentioned means including a resistance valve responsive to the output pressure of said source.

24. In combination, a movable platen, an operating cylinder therefor, a slide, an operating cylinder therefor, a source of fluid pressure, connecting means between said source and said cylinders to connect said cylinders to said source in parallel relationship, a control valve for controlling the output of said source, a governing valve for causing operation of said control valve to reverse the output from said source, and a resistance valve operative during the flow of fluid in one direction through said connections to prevent access to said platen operating cylinder until the pressure within said slide operating cylinder has built up to a predetermined value.

25. In combination, a movable platen, an operating cylinder therefor, a slide, an operating cylinder therefor, a source of fluid pressure, connecting means between said source and said cylinders to connect said cylinders to said source in parallel relationship, a control valve for controlling the output of said source, a governing valve for causing operation of said control valve to reverse the output from said source, a resistance valve operative during the flow of fluid in one direction through said connections to prevent access to said platen operating cylinder until the pressure within said slide operating cylinder has built up to a predetermined value, means operable by said slide at one limit of its movement for controlling said governing valve, and a second resistance valve responsive to output pressure at the other limit of movement of said slide for controlling said governing valve.

26. In combination, a movable platen, an operating cylinder therefor, a slide, an operating cylinder therefor, a source of fluid pressure, connecting means between said source and said cylinders to connect said cylinders to said source in parallel relationship, a control valve for controlling the output of said source, a governing valve for causing operation of said control valve to reverse the output from said source, a resistance valve operative during the flow of fluid in one direction through said connections to prevent access to said platen operating cylinder until the pressure within said slide operating cylinder has built up to a predetermined value, means operable by said slide at one limit of its movement for controlling said governing valve, and a second resistance valve responsive to output pressure at the other limit of movement of said slide for controlling said governing valve, said second mentioned resistance valve having a lower resistance to the flow of fluid than has said first mentioned resistance valve.

27. In combination, a platen, an operating cylinder therefor, a tool slide, an operating cylinder therefor, said last mentioned operating cylinder being carried by said platen, a source of fluid pressure, connecting means between said source and said cylinders for connecting said cylinders to said source in parallel, a control valve for controlling the output of said source, said connecting means including pipe connections in which the direction of flow of fluid between said source and said cylinders is adapted to be reversed in response to operation of said control valve, a valve for governing the position of said control valve, fluid pressure responsive means for moving said governing valve to a forward position, fluid pressure responsive means for moving said governing valve to a reverse position, a first resistance valve for controlling communication between said source and said platen operating cylinder in response to pressure within said slide operating cylinder, and a second resistance valve responsive to the output pressure of said source in the retreating movement of said slide for causing movement of said governing valve to said reverse position.

28. In combination, a platen, an operating cylinder therefor, a tool slide, an operating cylinder therefor, a source of fluid pressure, means for connecting said source to said cylinders in parallel, a control valve for reversing the direction of flow of fluid between said source and said cylinders, a governing valve for governing said control valve to produce said reversal, means responsive to said slide in its extreme forward position for causing movement of said governing valve to reverse position, and means responsive to the output pressure of said source in the retreating movement of said slide for causing the movement of said governing valve to forward position.

29. In combination, a platen, an operating cylinder therefor, a tool slide, an operating cylinder therefor, a source of fluid pressure, means for connecting said source to said cylinders in parallel, a control valve for reversing the direction of flow of fluid between said source and said cylinders, a governing valve for governing said control valve to produce said reversal, means responsive to said slide in its extreme forward position for causing movement of said governing valve to reverse position, means responsive to the output pressure of said source in the retreating movement of said slide for causing the movement of said governing valve to forward position, and means responsive to movement of said platen for moving said control valve to neutral position to stop the delivery of fluid to said cylinders.

30. In combination, a platen, an operating cylinder therefor, a tool slide, an operating cylinder therefor, a source of fluid pressure, means for connecting said source to said cylinders in parallel, a control valve for reversing the direction of flow of fluid between said source and said cylinders, a governing valve for governing said control valve to produce said reversal, means responsive to said slide in its extreme forward position for causing movement of said governing valve to reverse position, and means responsive to the output pressure of said source in the retreating movement of said slide for causing the movement of said governing valve to forward position, said means responsive to output pressure of said source including a resistance valve for controlling connection to said governing valve in response to the pressure set up within said slide operating cylinder.

31. In a machine tool, in combination, a platen, an operating cylinder therefor, a tool slide, an operating cylinder for said tool slide, a source of fluid pressure, connections between said source and said cylinders for connecting said cylinders to said source in parallel, a control valve for controlling the direction of flow of fluid between said cylinders and said source, said connections between said source and said cylinders including pipe connections for delivering fluid from said source to said cylinders for causing forward operation of said cylinders in a predetermined sequence, said pipe connections including a check valve adapted to pass fluid only in the forward movements of said platen and said slide, said connections including a shunt circuit around said check valve, and a piston within said platen operating cylinder, said piston being adapted to control said shunt circuit.

32. In a machine tool, in combination, a platen, an operating cylinder therefor, a tool slide, an operating cylinder for said tool slide, a source of fluid pressure, connections between said source and said cylinders for connecting said cylinders to said source in parallel, a control valve for controlling the direction of flow of fluid between said cylinders and said source, said connections between said source and said cylinders including pipe connections for delivering fluid from said source to said cylinders for causing forward operation of said cylinders in a predetermined sequence, said pipe connections including a check valve adapted to pass fluid only in the forward movements of said platen and said slide, said connections including a shunt circuit around said check valve, a piston within said platen operating cylinder, said piston being adapted to control said shunt circuit, and a resistance valve for controlling the discharge of fluid from said platen operating cylinder during the retreating movement of said slide for preventing the completion of the retreating movement of said platen until the pressure within said slide operating cylinder has built up to a predetermined value.

33. In combination, a platen, an operating cylinder therefor, a slide, an operating cylinder therefor, each of said cylinders being provided with a piston, a source of pressure, connections between said source and said cylinders for connecting said cylinders to said source in parallel, said connections including a pair of pipe connections for carrying fluid in reverse directions between said source and said cylinders, one of said pipe connections being divided into a pair of branches, one of said branches leading to one extremity of said platen operating cylinder whereby fluid delivered into said branch may be operative to move the piston within said platen operating cylinder in a retreating direction, the other of said branches being connected to one extremity of said slide operating cylinder whereby fluid delivered through said last mentioned branch may move the piston within said slide operating cylinder in a retreating direction, said last mentioned branch including a check valve adapted to stop the flow of fluid from said source past said check valve to said slide operating cylinder, and a shunt circuit around said check valve controlled by the piston within said platen operating cylinder.

34. In combination, a platen, an operating cylinder therefor, a slide, an operating cylinder therefor, each of said cylinders being provided with a piston, a source of pressure, connections between said source and said cylinders for connecting said cylinders to said source in parallel, said connections including a pair of pipe connections for carrying fluid in reverse directions between said source and said cylinders, one of said pipe connections being divided into a pair of branches, one of said branches leading to one extremity of said platen operating cylinder whereby fluid delivered into said branch may be operative to move the piston within said platen operating cylinder in a retreating direction, the other of said branches being connected to one extremity of said slide operating cylinder whereby fluid delivered through said last mentioned branch may move the piston within said slide operating cylinder in a retreating direction, said last mentioned branch including a check valve adapted to stop the flow of fluid from said source past said check valve to said slide operating cylinder, a shunt circuit around said check valve controlled by the piston within said platen operating cylinder, and valve means for controlling the discharge of fluid from said platen operating cylinder during the latter portion of the retreating movement of said platen, said valve means being responsive to the pressure set up within said platen operating cylinder on the discharge side thereof during the retreating movement of said platen.

35. In a machine tool, in combination, a platen, an operating cylinder therefor, a tool slide, an operating cylinder for said tool slide, a source of fluid pressure, connecting means for connecting said source to said cylinders in parallel, control means for delivering fluid through said connecting means to said cylinders to cause same to move said platen and said slide in forward movements in a predetermined sequence, means operable by said tool slide at the forward limit of its movement for governing said control means to cause said source to deliver fluid to said cylinders in directions to cause retreating movements of said platen and said tool slide in a predetermined sequence.

36. In a machine tool, in combination, a platen, an operating cylinder therefor, a tool slide, an operating cylinder for said tool slide, a source of fluid pressure, connecting means for connecting said source to said cylinders in parallel, control means for delivering fluid through said connecting means to said cylinders to cause same to move said platen and said slide in forward movements in a predetermined sequence, means operable by said tool slide at the forward limit of its movement for governing said control means to cause said source to deliver fluid to said cylinders in directions to cause retreating movements of said platen and said tool slide in a predetermined sequence, said connecting means including a pipe connection for delivering fluid to one end portion of said platen operating cylinder to cause retreating movement of said platen, said pipe connection having a branch provided with a check valve for communicating fluid to one end portion of said slide operating cylinder to cause retreating movement of said slide, said branch having communication with said platen operating cylinder at a region spaced from the forward extremity of said platen operating cylinder, said platen operating cylinder being provided with a piston adapted when said piston is at the forward limit of its travel to obstruct the connection between said cylinder and said branch operating cylinder, said platen operating cylinder being adapted to provide communication between said source and said branch in a shunt circuit around said check valve when said piston has moved a predetermined distance from its full forward position in the retreating movement of said platen.

37. In a machine tool, in combination, a platen, an operating cylinder therefor, a tool slide, an operating cylinder for said tool slide, a source of fluid pressure, connecting means for connecting said source to said cylinders in parallel, control means for delivering fluid through said connecting means to said cylinders to cause same to move said platen and said slide in forward movements in a predetermined sequence, means operable by said tool slide at the forward limit of its movement for governing said control means to cause said source to deliver fluid to said cylinders in directions to cause retreating movements of said platen and said tool slide in a predetermined sequence, said connecting means including a pipe connection for delivering fluid to one end portion of said platen operating cylinder to cause retreating movement of said platen, said pipe connection having a branch provided with a check valve for communicating fluid to one end portion of said slide operating cylinder to cause retreating movement of said slide, said branch having communication with said platen operating cylinder at a region spaced from the forward extremity of said platen operating cylinder, said platen operating cylinder being provided with a piston adapted when said piston is at the forward limit of its travel to obstruct the connection between said cylinder and said branch operating cylinder, said platen operating cylinder being adapted to provide communication between said source and said branch in a shunt circuit around said check valve when said piston has moved a predetermined distance from its full forward position in the retreating movement of said platen, said connections also including a valve for controlling the discharge of fluid from said platen operating cylinder in the retreating movement of said platen, said valve being adapted to open when pressure within said branch has risen to a predetermined value.

38. In combination, a platen, an operating cylinder therefor, a tool slide, an operating cylinder therefor, a source of pressure, pipe connections for connecting said cylinders to said source in parallel, said pipe connections including resistance valves for controlling the flow of fluid through said pipe connections to alternately apply pressure to said cylinders in a predetermined sequence, and control valves in said pipe connections for predetermining said sequence.

39. In combination, a platen, an operating cylinder therefor, a tool slide, an operating cylinder for said tool slide, a pair of conduits adapted to carry fluid under pressure to and from said cylinders in parallel, a resistance valve cooperatively associated with said cylinders for causing the complete operation of said platen operating cylinder in a forward direction before the inauguration of operation of said slide operating cylinder in a forward direction, a second resistance valve for causing complete operation of said slide operating cylinder in a retreating movement before inauguration of operation of said platen operating cylinder in its retreating movement, a third resistance valve for causing the complete operation of said slide operating cylinder intermediate of the range of operation of said platen operating cylinder, and control valve means for controlling the connections of said resistance valves to said conduits.

40. In a machine tool, in combination, a movable tool carrying member, fluid pressure means for moving said tool carrying member, a source of fluid pressure, a control valve for controlling the output of said source, fluid pressure responsive governing means for said valve, means responsive to movement of said tool carrying member for admitting pressure from said source to said governing means, said last mentioned means including means responsive to movement of said tool carrying member for relieving said governing means of said pressure.

41. In a machine tool, in combination, a movable tool carrying member, fluid pressure means for moving said tool carrying member, a source of fluid pressure, a control valve for controlling the output of said source, fluid pressure responsive governing means for said valve, means responsive to movement of said tool carrying member for admitting pressure from said source to said governing means, said last mentioned means including means responsive to movement of said tool carrying member for relieving said governing means of said pressure, and manual means for controlling said valve independently of said governing means.

WILLIAM H. FOSTER.